United States Patent
Kaburagi

(10) Patent No.: US 7,706,021 B2
(45) Date of Patent: Apr. 27, 2010

(54) IMAGE PROCESSING APPARATUS AND IMAGE PROCESSING METHOD FOR SUPPRESSING JAGGIES IN THE EDGE PORTIONS OF IMAGE

(75) Inventor: Hiroshi Kaburagi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1216 days.

(21) Appl. No.: 11/260,193

(22) Filed: Oct. 28, 2005

(65) Prior Publication Data

US 2006/0092475 A1    May 4, 2006

(30) Foreign Application Priority Data

Nov. 1, 2004   (JP) ............................. 2004-318239
Mar. 18, 2005  (JP) ............................. 2005-080592

(51) Int. Cl.
*G06F 15/00*   (2006.01)
*G06K 1/00*    (2006.01)
*H04N 1/60*    (2006.01)
*G06K 15/00*   (2006.01)
*H04N 1/405*   (2006.01)

(52) U.S. Cl. ........................................ 358/1.9; 358/3.1
(58) Field of Classification Search .................. 358/1.9, 358/3.06, 3.09, 3.1
See application file for complete search history.

(56) References Cited

U.S. PATENT DOCUMENTS

| 6,608,941 | B1 * | 8/2003 | Suzuki et al. | 382/272 |
| 7,116,442 | B2 * | 10/2006 | Toriyama | 358/1.9 |
| 2005/0083552 | A1 | 4/2005 | Kaburagi | 358/2.1 |

FOREIGN PATENT DOCUMENTS

| JP | 1994-296236 | 10/1994 |
| JP | 10-42141 | 2/1998 |
| JP | 1998-336454 | 12/1998 |
| JP | 2000-125134 | 4/2000 |
| JP | 2005-129995 | 5/2005 |

* cited by examiner

*Primary Examiner*—Douglas Q Tran
(74) *Attorney, Agent, or Firm*—Fitzpatrick, Cella, Harper & Scinto

(57) ABSTRACT

To suppress jaggies in second image data on the basis of first image data, the second image data obtained by executing halftoning processing for the first image data, and attribute data representing an attribute of each pixel contained in the first image data, a judgment signal indicating whether to execute smoothing processing is output on the basis of the attribute data. Edge correction data is generated from the first image data by executing smoothing processing in accordance with the judgment signal. The pixel data of the second image data is compared with the pixel data of the edge correction data. The pixel data having a higher density is output. Jaggies generated by halftoning processing can be suppressed with a simple arrangement at a low cost.

19 Claims, 33 Drawing Sheets

FIG. 6A

Attribute Decoder Input(4bit) — 601

| | REOS | obj | chare | vec | | | | |
|---|---|---|---|---|---|---|---|---|
| | bit4 | bit5 | bit2 | bit0 | thin | graphic | line | font |
| 0 | 0 | 0 | 0 | 0 | 1 | 0 | 0 | 0 |
| 1 | 0 | 0 | 0 | 1 | 1 | 0 | 0 | 0 |
| 2 | 0 | 0 | 1 | 0 | 1 | 0 | 0 | 0 |
| 3 | 0 | 0 | 1 | 1 | 1 | 0 | 0 | 0 |
| 4 | 0 | 1 | 0 | 0 | 1 | 0 | 0 | 0 |
| 5 | 0 | 1 | 0 | 1 | 1 | 1 | 0 | 0 |
| 6 | 0 | 1 | 1 | 0 | 1 | 0 | 1 | 0 |
| 7 | 0 | 1 | 1 | 1 | 1 | 0 | 0 | 1 |
| 8 | 1 | 0 | 0 | 0 | 0 | 0 | 0 | 0 |
| 9 | 1 | 0 | 0 | 1 | 0 | 0 | 0 | 0 |
| 10 | 1 | 0 | 1 | 0 | 0 | 0 | 0 | 0 |
| 11 | 1 | 0 | 1 | 1 | 0 | 0 | 0 | 0 |
| 12 | 1 | 1 | 0 | 0 | 0 | 0 | 0 | 0 |
| 13 | 1 | 1 | 0 | 1 | 0 | 1 | 0 | 0 |
| 14 | 1 | 1 | 1 | 0 | 0 | 0 | 1 | 0 |
| 15 | 1 | 1 | 1 | 1 | 0 | 0 | 0 | 1 |

FIG. 6B

Attribute Decoder Output(8bit)

602

| ImageType1 | 0x02 | — |
|---|---|---|
| ImageType1 | 0x02 | — |
| ImageType1 | 0x02 | — |
| ImageType1 | 0x02 | — |
| ImageType1 | 0x02 | No REOS ALL (image) |
| ImageType2 | 0x04 | No REOS (graphic) |
| ImageType3 | 0x08 | No REOS (line) |
| ImageType4 | 0x10 | No REOS (font) |
| ImageType0 | 0x01 | — |
| ImageType0 | 0x01 | — |
| ImageType0 | 0x01 | — |
| ImageType0 | 0x01 | — |
| ImageType0 | 0x01 | REOS ALL (image) |
| ImageType5 | 0x20 | REOS (graphic) |
| ImageType6 | 0x40 | REOS (line) |
| ImageType7 | 0x80 | REOS (font) |

FIG. 7B

```
if(reg_atb==0){
    atr = attrdec(*inDataZ, atr_patarns, 4); // from Attribute Decoder
    if(atr==0x02 || atr==0x04 || atr==0x08 || atr==0x10){ thin=1; }
    else{ thin=0; } if(atr==0x04 || atr==0x20){ graphic=1; }
    else{ graphic=0; } if(atr==0x08 || atr==0x40){ line=1; }
    else{ line=0; } if(atr==0x10 || atr==0x80){ font=1; }
    else{ font=0; } if((reg_Zcheck[0]<(*InData))&&(font==1)){
        *out=1;
    }
    else if((reg_Zcheck[1]<(*InData))&&(graphic==1)){
        *out=1;
    }
    else if((reg_Zcheck[2]<(*InData))&&(line==1)){
        *out=1;
    }
    else{
        *out=0;
    }
}                                                                   ← A if(ThinJudge==1){ // only graphic.
    if((thin==1)&&(graphic==1)){
        OutDataZ[yy][xx]=0;
    }
}
else if(ThinJudge==2){ // only font.
    if((thin==1)&&(font==1)){
        OutDataZ[yy][xx]=0;
    }
}
else if(ThinJudge==3){ // only line.
    if((thin==1)&&(line==1)){
        OutDataZ[yy][xx]=0;
    }
}
else if(ThinJudge==4){ // graphic & font.
    if((thin==1)&&(graphic==1) || (font==1)){
        OutDataZ[yy][xx]=0;
    }
}
else if(ThinJudge==5){ // graphic & line.
    if((thin==1)&&(graphic==1) || (line==1)){
        OutDataZ[yy][xx]=0;
    }
}
else if(ThinJudge==6){ // font & line.
    if((thin==1)&&(graphic==1)||(line==1)){
        OutDataZ[yy][xx]=0;
    }
}
else if(ThinJudge==7){ // thin flag all.
    if((thin==1){
        OutDataZ[yy][xx]=0;
    }
}                                                                   ← B
```

FIG. 7C

```
else if(reg_atb==1){
    if((reg_Zcheck[0]<=InData'[yy][xx]) || (reg_Zcheck[1]<=InData'[yy][xx]) || (reg_Zcheck[2]<=InData'[yy][xx])){    ⎫
        OutDataZ[YY][XX]=1;                                                                                          ⎬ C
    }                                                                                                                 
    else{
        OutDataZ[yy][xx]=0;
    }
}
else if(reg_atb==2){                    ⎫
    if((InDataS[yy][xx]>=reg_air)){      ⎪
        OutDataZ[YY][XX]=1;              ⎬ D
    }                                    ⎪
    else{                                ⎪
        OutDataZ[yy][xx]=0;              ⎭
    }
}
else{                                   ⎫
    OutDataZ[yy][xx]=0;                 ⎬ E
}                                       ⎭
```

F I G. 8B

```
{
  /*=====make select sig=====*/
  if((ast_params->edgeLUTsel)==1)sel_InData=LUTE[InData[yy][xx]];
  else                           sel_InData=(InData[yy][xx]<<1)+1;

sel_InDataS=(InDataS[yy][xx])<<(4-(ast_params->InDataSBits));
  add=(unsigned char)pow(2.0, (double)(4-(ast_params->InDataSBits)))-1;
  sel_InDataS+=add;

if(sel_InDataS<=sel_InData){select_sig=1;}
  else{                       select_sig=0;}
}
```

F I G. 10B

```
bc=BorderCount(xx, yy, OutDataX);
bc=DensCheck(InData[yy][xx], reg_Zcheck, bc);

unsigned char BorderCount(int xx, int yy, unsigned char**DataZ)
{
    int ii,jj;
    int sum;
    /*===remark line check===*/
    sum=0;
    for(jj=yy-1; jj<=yy+1; jj++){
        for(ii=xx1; ii<=xx+1;ii++){
            if(valCheck(DataZ, jj, ii, Height, Width)!=0){
                sum++;
            }
        }
    }
    return (sum);
} unsigned char DensCheck(unsigned char data, unsigned char *reg_Zcheck, unsigned char bc)
{
    unsigned char ck;
    if((((reg_Zcheck[0]==(data)) || (reg_Zcheck[0]+1==(data)) || (reg_Zcheck[1]+1==(data)))&&(data!=0)){
        ck=0;
    }
    else if((((reg_Zcheck[1]==(data)) || (reg_Zcheck[1]+1==(data)))&&(data!=0)){
        ck=0;
    }
    else if((((reg_Zcheck[2]==(data)) || (reg_Zcheck[2]+1==(data)))&&(data!=0)){
        ck=0;
    }
    else{
        ck=bc;
    }
    return(ck);
}
```

A — BorderCount section
B — DensCheck section

F I G. 11B

```
unsigned char AdaptiveSmoothing(xx, yy, InData, InDataS, ast_params, LUTE, bc, reg_Zcheck, patternCK, astPower)
int xx, yy;
unsigned char**InData;
unsigned char**InDataS;
AST_Params*ast_params;
unsigned char*LUTE;
unsigned char bc;
unsigned char patternCK;
unsigned char astPower;
{
    unsigned char out;

if(bc==0 bc>=astPower)&&(InData[yy][xx]!=0){
        out=InDataS[yy][xx];
    }
    else{
        if(ast_params->sstAllOffSW==0){ //0:SST ALL OFF              //1:SST ON(accede to sstOnOff(1-9)para.)
            out=LUTE[InData[yy][xx]];
        }
        else{
            out=LUTE[patternCK];
        }
    }
    return(out);
}
```

JAGGIES

JAGGIES ARE SUPPRESSED

F I G. 18A
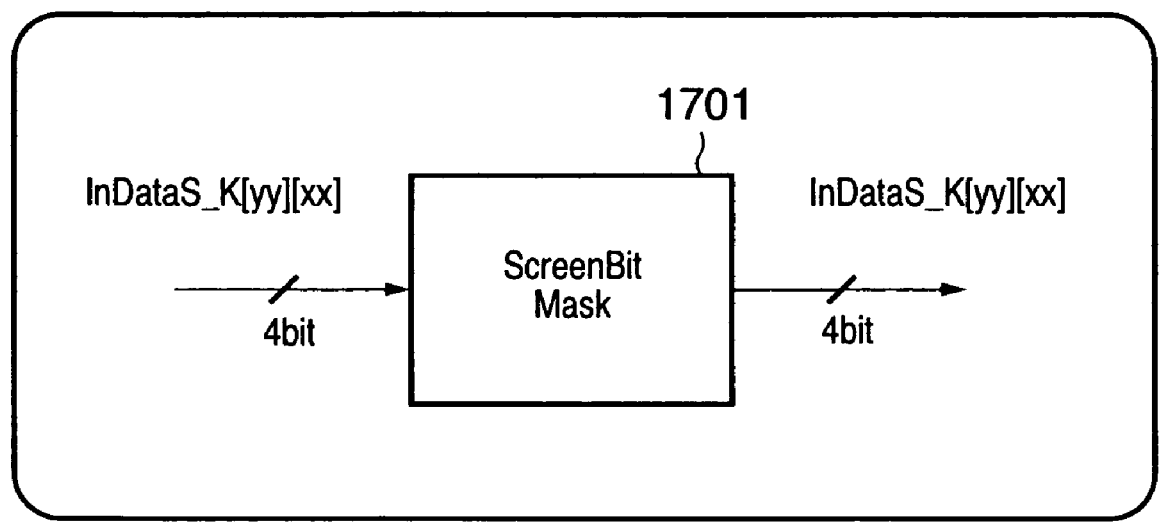

FIG. 18B

```
if((ast_params->bit_select)==3){ //1bit mode(600 / 1200dpi)
   InDataS_K[yy][xx]=(InDataS_K[yy][xx])&(0x08);
}
else if((ast_params->bit_select)==2){ //2bit mode(600 / 1200dpi)
   InDataS_K[yy][xx]=(InDataS_K[yy][xx])&(0x0C);
}
else if((ast_params->bit_select)==1){ //3bit mode(600dpi)
   InDataS_K[yy][xx]=(InDataS_K[yy][xx])&(0x0E);
}
[through] // 4bit mode(600dpi)
```

F I G. 19B

```
/*======bit32_conv module(3bit->2bit)======*/
    if((ast_params->bit_select)==3){
        if(InData_K[yy][xx]==7)      InData_K[yy][xx]=ast_params->bit32_conv7;
        else if(InData_K[yy][xx]==6) InData_K[yy][xx]=ast_params->bit32_conv6;
        else if(InData_K[yy][xx]==5) InData_K[yy][xx]=ast_params->bit32_conv5;
        else if(InData_K[yy][xx]==4) InData_K[yy][xx]=ast_params->bit32_conv4;
        else if(InData_K[yy][xx]==3) InData_K[yy][xx]=ast_params->bit32_conv3;
        else if(InData_K[yy][xx]==2) InData_K[yy][xx]=ast_params->bit32_conv2;
        else if(InData_K[yy][xx]==1) InData_K[yy][xx]=ast_params->bit32_conv1;
        else                         InData_K[yy][xx]=0;
    }
```

FIG. 21B

```
/*======bit21_conv module======*/
if(ast_params->dpi_select==1){
  for(yy=0; yy<Height, yy++){
    for(xx=0; xx<Width, xx++){ if(InData[yy][xx]<=(ast_params->bit_th)){
        InData_FiFoUpDown[yy][xx]=()+
      }
      else{
        InData_FiFoUpDown[yy][xx]=(ast_params->bit21_conv)*2+1;
      }

}
   }
  }
  else{//600dpi
    for(yy=0; yy<Height, yy++){
      for(xx=0; xx<Width, xx++){
        InData_FiFoUpDown[yy][xx]=InData[yy][xx];
      }
    }
  }
```

FIG. 21C

```
/*======bit23_conv module(only remark pixel)======*/
  if(ast_params->dpi_select==1){
    for(yy=0; yy<Height; yy++){
      for(xx=0; xx=<Width; xx++){
        /*======bit11_conv module(2bit->3bit)======*/
        if(InData[yy][xx]==3)      InData_FiFoCenter[yy][xx]=ast_params->bit23_conv3;
        else if(InData[yy][xx]==2) InData_FiFoCenter[yy][xx]=ast_params->bit23_conv2;
        else if(InData[yy][xx]==1) InData_FiFoCenter[yy][xx]=ast_params->bit23_conv1;
        else                       InData_FiFoCenter[yy][xx]=0;
      }
    }
  }
  else{
    for(yy=0; yy<Height; yy++){
      for(xx=0; xx<Width; xx++){
        InData_FiFoCenter[yy][xx]=InData[yy][xx];
      }
    }
  }
```

FIG. 22B

```
/*======ScreenBitShift module(0 : 4bit 1 : 3bit 2 : 2bit 3 : 1bit)======*/
if((ast_params.bit_select)==3){ //1bit
  for(yy=0; yy<Height; yy++){
    for(xx=0; xx=<Width; xx++){
      if(InDataS_K[yy][xx]==0)    InDataS_K[yy][xx]=0;
      else                        InDataS_K[yy][xx]=15;
    }
  }
}
else if((ast_params.bit_select)==2){ //2bit
  for(yy=0; yy<Height; yy++){
    for(xx=0; xx=<Width; xx++){
      if(InDataS_K[yy][xx]==12)        InDataS_K[yy][xx]=15;
      else if(InDataS_K[yy][xx]==8)    InDataS_K[yy][xx]=10;
      else if(InDataS_K[yy][xx]==4)    InDataS_K[yy][xx]=5;
      else                             InDataS_K[yy][xx]=0;
    }
  }
}
else if((ast_params.bit_select)==1){ //3bit
  for(yy=0; yy<Height; yy++){
    for(xx=0; xx=<Width; xx++){
      if(InDataS_K[yy][xx]==14)        InDataS_K[yy][xx]=15;
      else if(InDataS_K[yy][xx]==12)   InDataS_K[yy][xx]=13;
      else if(InDataS_K[yy][xx]==10)   InDataS_K[yy][xx]=11;
      else if(InDataS_K[yy][xx]==8)    InDataS_K[yy][xx]=9;
      else if(InDataS_K[yy][xx]==6)    InDataS_K[yy][xx]=6;
      else if(InDataS_K[yy][xx]==4)    InDataS_K[yy][xx]=4;
      else if(InDataS_K[yy][xx]==2)    InDataS_K[yy][xx]=2;
      else                             InDataS_K[yy][xx]=0;
    }
  }
}
```

IMAGE PROCESSING APPARATUS AND IMAGE PROCESSING METHOD FOR SUPPRESSING JAGGIES IN THE EDGE PORTIONS OF IMAGE

FIELD OF THE INVENTION

The present invention relates to an image processing apparatus and image processing method and, more particularly, to an image processing apparatus and image processing method which suppress, at a low cost, jaggies in the edge portions of image which has undergone halftoning processing.

More specifically, the present invention is oriented to a copying machine or printer using an electrophotographic process but can also be applied to an apparatus using another process, like an inkjet printer or display.

BACKGROUND OF THE INVENTION

Conventionally, several techniques have been proposed to cause an image processing apparatus to suppress jaggies generated in a low-resolution printer.

FIG. 14 indicates jaggies generated in, e.g., the edge portion of a character.

FIG. 14 is a schematic view for explaining an example of a character image in a conventional image processing apparatus. FIG. 14 shows a state wherein jaggies are generated in, e.g., the edge portions of a character.

Referring to FIG. 14, each cell corresponds to one pixel. In this example, the density is 300 dpi. An "L"-shaped portion indicates a jaggy. Fifteen "L"-shaped portions are shown in FIG. 14.

In a conventional technique to suppress the jaggy, pattern matching is executed for jaggies. Pixel is added to each portion corresponding to the pattern, or pixel that causes the jaggy is removed, thereby suppressing the jaggies.

The pattern matching is a known technique, and a detailed description thereof will be omitted.

FIGS. 15A and 15B depict schematic views for explaining an example of character processing in the conventional image processing apparatus. FIGS. 15A and 15B show states wherein jaggies generated in, e.g., the edge portions of a character are suppressed.

In the state shown in FIG. 15A, halftone data is added to each pixel corresponding to the pattern. Note that halftone data is added to each "L"-shaped portion described above. Especially in a printer with an electrophotographic process, the image quality can be improved greatly only by adding halftone data to jaggy portions.

In the state shown in FIG. 15B, pixel-divided data is added to each pixel corresponding to the pattern.

"Pixel division" is a technique of dividing one pixel of 300 dpi into a plurality of parts and a dot is assigned to each part. In this example, a pixel is vertically divided into two parts. The pixel division is also a known technique, and a detailed description thereof will be omitted.

As described above, an example of smoothing processing is implemented by adding a halftone dot or pixel-divided dot to each jaggy portion. As another possible processing, dark pixels in jaggy portions may be changed to light dots, i.e. halftone dots, or full dots in jaggy portions are converted into pixel-divided dots.

Japanese Patent Laid-Open No. 10-42141 discloses a technique of improving such problems in a conventional image processing apparatus of this type.

A technique shown in FIGS. 16A and 16B is also known. This technique is used to suppress jaggies generated by halftoning processing such as screen processing. The jaggies are generated at a resolution lower than that of a printer. The jaggies were not suppressed by the above-described method, but are suppressed by the technique disclosed in JPA 10-42141.

More specifically, the jaggy portions shown in FIG. 16A are generated by an image transforming method such as screen processing. The image quality becomes poor at a resolution lower than the printer resolution (300 dpi in this example) as shown in FIG. 16A. In FIG. 16B, halftone dots (halftone data) are output to each edge portion, thereby suppressing the jaggies.

As the printer resolution rises, the above-described jaggies caused by the printer resolution rarely pose problems. More specifically, when the printer resolution increases to, e.g. 600 dpi or 1,200 dpi, jaggies are rarely recognized by human eyes.

However, jaggies generated by the image transforming method such as screen processing can easily be recognized even at a higher printer resolution. In screen processing, pixels are formed by concentrating a plurality of dots by using a pattern generally called fattening, thereby expressing a pseudo screen resolution (number of lines). Hence, a screen resolution (number of lines) higher than the printer resolution is never used. When screen-processed image data is output by a printer having a resolution of, e.g., 600 dpi, the screen resolution (number of lines) is generally, about 133 to 175 lines and, at most, about 268 lines. If a screen with a larger number of lines than the above number of lines is used, no stable image quality can be obtained because of the characteristic of the electrophotographic printer. The unit of the number of lines is generally defined as LPI (Lines Per Inch).

To suppress jaggies generated by the latter image transforming method (screen processing), a method of assigning halftone dots to the above-described edge portions is used. However, this method requires complex operations and a large memory capacity. For this reason, an apparatus equipped with the technique to implement the method tends to be expensive. To equip an inexpensive electrophotographic printer or MFP with the technique, a method capable of suppress the above-described jaggies with a simpler arrangement is necessary.

SUMMARY OF THE INVENTION

It is a feature of the present invention to suppress jaggies generated by an image transforming method by a simple arrangement.

According to an aspect of the present invention, there is provided with an image processing apparatus for suppressing jaggies in second image data on the basis of first image data, the second image data obtained by executing halftoning processing for the first image data, and attribute data representing an attribute of each pixel contained in the first image data, comprising:

determination means for determining whether or not to execute smoothing processing on the basis of the attribute data, and outputting a judgment signal indicating the determination result;

edge correction generation means for generating edge correction data from the first image data by executing smoothing processing in accordance with the judgment signal; and selection means for comparing pixel data of the second image data with pixel data of the edge correction data output by the edge correction generation means and selecting the pixel data having a higher density.

According to another aspect of the present invention, there is provided with an image processing method of suppressing jaggies in second image data on the basis of first image data, the second image data obtained by executing halftoning processing for the first image data, and attribute data representing an attribute of each pixel contained in the first image data, the method comprising:

a determination step of determining whether or not to execute smoothing processing on the basis of the attribute data, and outputting a judgment signal indicating the determination result;

an edge correction generation step of generating edge correction data from the first image data by executing smoothing processing in accordance with the judgment signal; and a selection step of comparing pixel data of the second image data with pixel data of the edge correction data output in the edge correction generation step and outputting pixel data having a higher density.

According to the present invention, jaggies generated by halftoning processing can be suppressed with a simple arrangement.

This is effective for jaggies contained in image data, which has undergone image transformation such as screen processing, image data having a degradation in image quality in an edge portion as in JPEG, or image data which has undergone error diffusion processing so that any degradation in image quality can be prevented properly.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 6A and 6B depict views for explaining processing executed by an attribute decoder shown in FIG. 5;

FIG. 7B depicts a view showing an example in which processing of the determination section is described by a program language;

FIG. 7C depicts a view showing an example in which processing of the determination section is described by a program language;

FIG. 8B depicts a view showing an example in which processing of the selection section is described by a program language;

FIG. 10B depicts a view showing an example in which processing of the edge detection processing section is described by a program language;

FIG. 11B depicts a view showing an example in which processing of the adaptive smoothing processor is described by a program language;

FIG. 18A is a block diagram showing the input/output signals of a bit mask section in FIG. 17;

FIG. 18B depicts a view showing an example in which processing of the bit mask section is described by a program language;

FIG. 19B depicts a view showing an example in which processing of the bit conversion section is described by a program language;

FIG. 21B depicts a view showing an example in which processing of the bit21_conv module in FIG. 21A is described by a program language;

FIG. 21C depicts a view showing an example in which processing of the bit23_conv module in FIG. 21A is described by a program language;

FIG. 22B depicts a view showing an example in which processing of the bit shift section is described by a program language.

DETAILED DESCRIPTION OF THE PREFERRED EMBODIMENTS

Preferred embodiments of the present invention will now be described in detail in accordance with the accompanying drawings.

Figure 2:
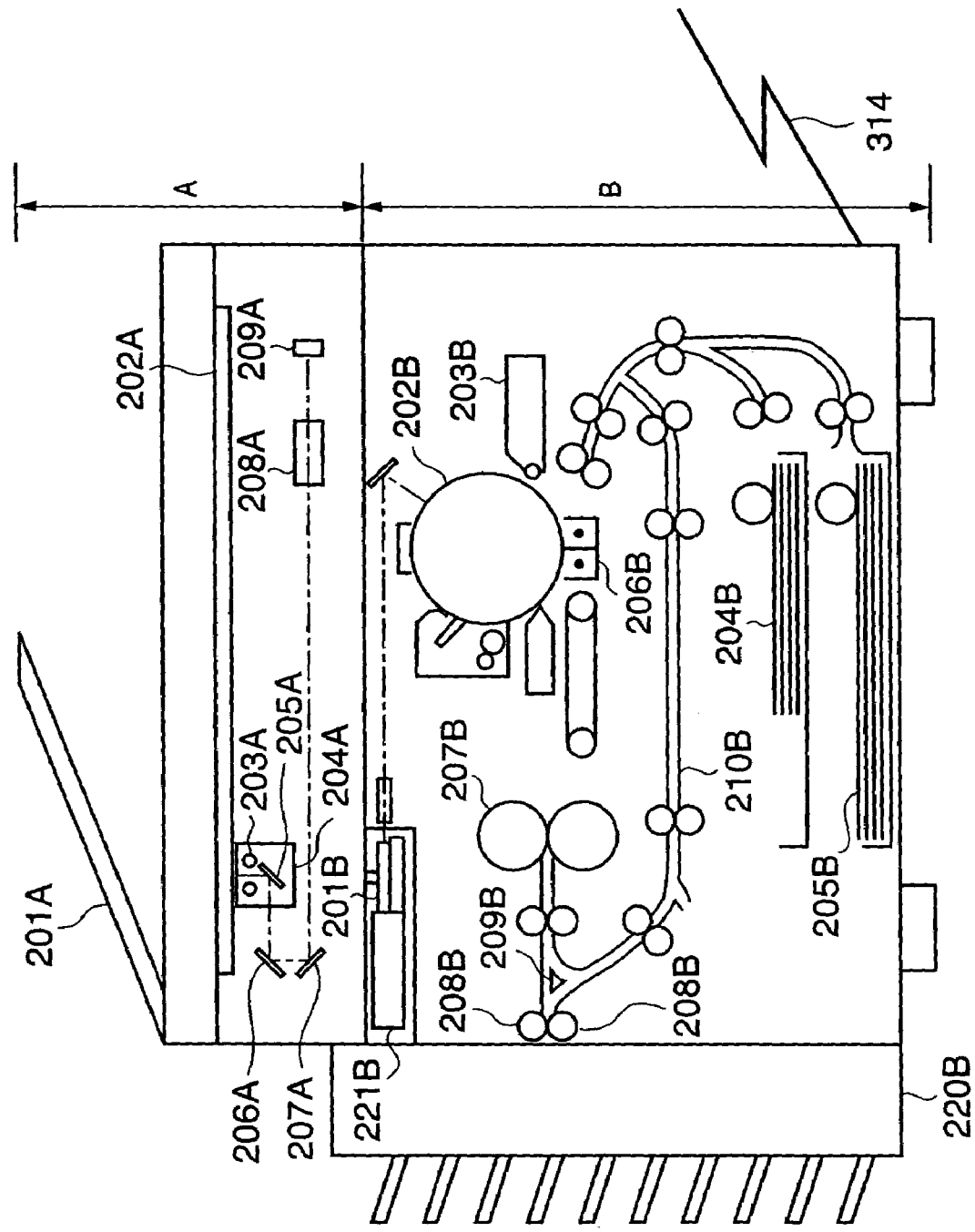
FIG. 2 depicts a schematic sectional view showing an example of a multi-functional peripheral to which an image processing apparatus according to the present invention can be applied.

FIG. 2 depicts a schematic sectional view showing an arrangement example of a multi-functional device as an embodiment of an image processing apparatus according to the present invention. The multi-functional device mechanically includes a color scanner section A and printer section B. As a preferred embodiment, a multi-functional device with a scanner using electrophotography will be described here. Image data as the target of the present embodiment is an image signal represented by vector information. An image signal represented by vector information includes PDL (Page Description Language) data sent from a computer such as a PC or primitive intermediate data generated by interpreting PDL. The image signal may also include information obtained by vectorizing an image signal read by the scanner. These pieces of vector information are data representing various kinds of objects such as a text and graphic and are finally converted into bitmap data. The following embodiment is especially oriented to a copying machine or printer using an electrophotographic process, but the present invention can also be applied to an apparatus using another process, like an inkjet printer or display.

In the color scanner section A shown in FIG. 2, a document feeder 201A sequentially feeds a document of stacked documents onto a platen glass 202A one by one. After the reading operation of the document by the scanner is ended, the read document on the platen glass 202A is discharged. In a case of reading document, a document is conveyed to the platen glass 202A, and a lamp 203A is turned on. A scanner unit 204A having the lamp 203A is moved to expose and scan the document. Reflected light from the document by scanning is guided to a CCD color image sensor (to be simply referred to as a "CCD" hereinafter) 209A via mirrors 205A, 206A, and 207A and lens 208A.

The reflected light incident in the CCD 209A is separated into three colors R (red), G (green), and B (blue) and read as a luminance signal for each color. The luminance signal of each color output from the CCD 209A is A/D-converted into digital image data of each color and input to an image processing section (304 in FIG. 3). Known image processing such as shading correction, gray level correction, quantization (N-values quantization), and smoothing processing is executed. Then, the image data is transferred to the printer section B (305).

In the printer section B shown in FIG. 2, a laser driver 221B drives a laser emitting section 201B. The laser emitting section 201B emits a laser beam corresponding to the image data of each color output from the image processing section 304. A photosensitive drum 202B is irradiated with the laser beam. A latent image corresponding to the laser beam is formed on the photosensitive drum 202B.

A developing unit 203B applies toner serving as a developing substance to the latent image portion on the photosensitive drum 202B. FIG. 2 illustrates only one developing unit for the illustrative convenience. However, toner is prepared for each of colors C (cyan), M (magenta), Y (yellow), and K (black). Hence, four developing units are provided. Instead of the above-described arrangement, four sets of photosensitive drums and developing units may be provided for the respective colors.

A printing paper sheet is fed from selected one of cassettes 204B and 205B at a timing synchronous with the start of above-described laser irradiation and conveyed to a transfer section 206B.

With this operation, the toner applied to the photosensitive drum 202B can be transferred to the printing paper sheet. The paper sheet on which the toner is transferred is conveyed to a fixing section 207B. The fixing section 207B fixes the toner on the paper sheet by heat and pressure. The paper sheet, which has passed through the fixing section 207B, is discharged by discharge rollers 208B. A sorter 220B sorts discharged paper sheets by storing them in predetermined bins.

Without sort setting, the sorter 220B stores the paper sheets in the uppermost bin. When double-sided printing is set, the paper sheet conveyed to the discharge rollers 208B is guided to the re-feed convey path through a flapper 209B by reversing the rotational direction of the discharge rollers 208B. When multi-overlay printing is set, the paper sheet is guided to a re-feed convey path 210B through the flapper 209B not to convey the paper sheet to the discharge rollers 208B. The paper sheet guided to the re-feed convey path is fed to the transfer section 206B at the above-described timing.

The latent image formation, developing processing, and fixing for the respective colors are implemented by repeating the latent image formation and the like four times (for Y, M, C, K) by using the above-described paper sheet conveyance mechanism, as is known.

With a network cable 314, a system generally called an Ethernet is formed. When a physical cable such as 10BaseT or 10Base5 and a protocol such as TCP/IP may be used, information transmission/reception or data transfer can be done between the connected units. The present invention is not limited to a wired system using a network cable. The same environment as described above can be built in a wireless network.

PDL data or a display list transmitted from the host computer through the network cable 314 is received by a network signal reception section 315 serving as an interface provided in the printer. The network signal reception section 315 includes a rasterize section (not shown) which interprets data transmitted from the host computer and generates bitmap data representing an image. PDL data or a display list holds data representing the attribute of each object such as a text (character), graphic, and image. A rasterize section generates image data and an image attribute signal of each pixel by using the attribute data. The image attribute signal will be described later in detail.

The image data generated by the rasterize section is input to the image processing section 304, as well as a case of image data input from an image reading section 309. The image data is input to a filter, as indicated by an arrow, so that necessary image processing is executed. The image attribute signal is input to a smoothing processor. For color image data, density data of each of the colors C, M, Y, and K is generated, and the processing of the succeeding stage is executed for the data of each color.

The rasterize section may be provided outside the network signal reception section 315. In this embodiment, an arrangement to process data received through the network cable 314 will be described later.

Figure 3:
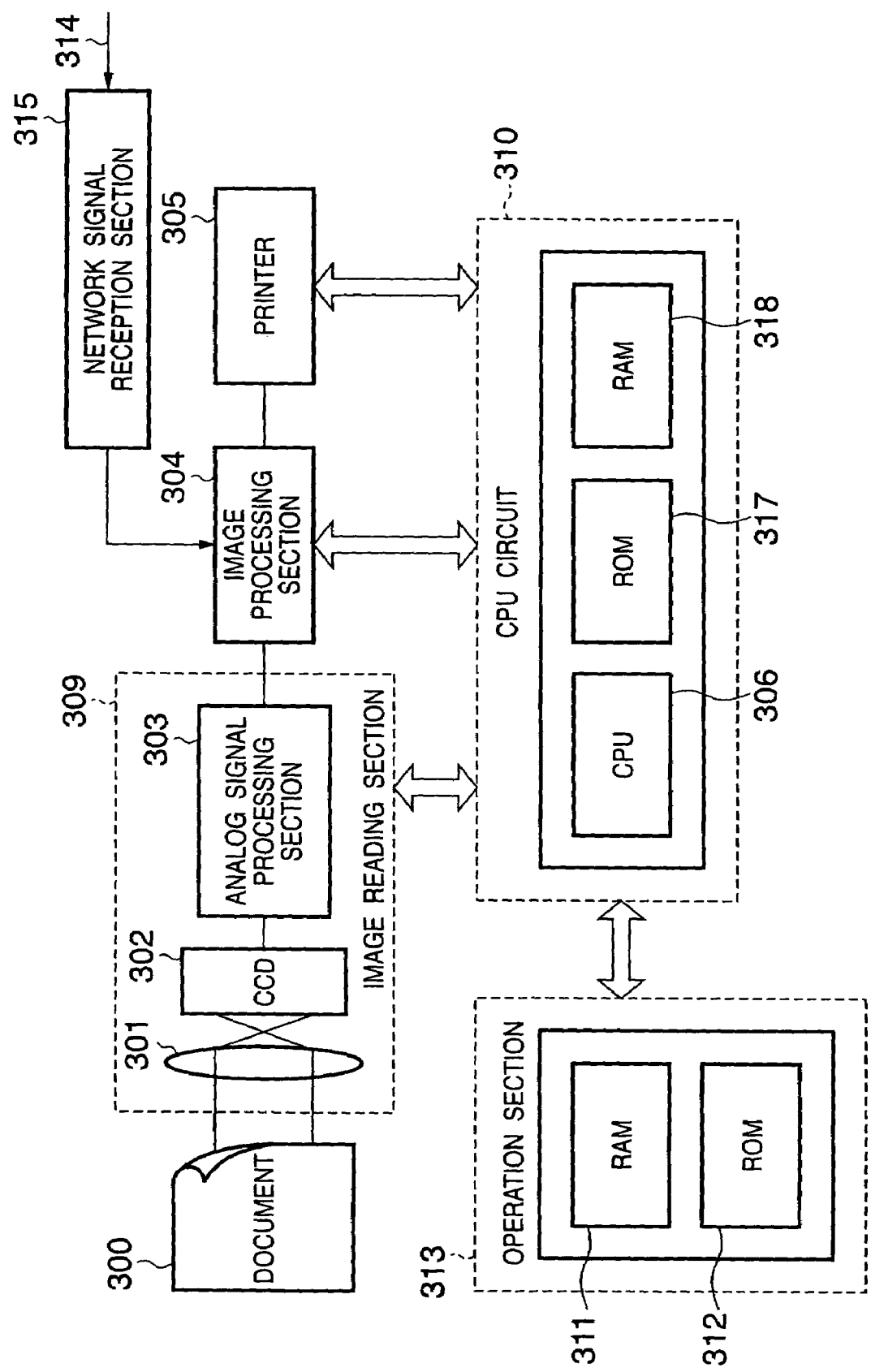
FIG. 3 is a block diagram for explaining the data processing configuration of the image processing apparatus shown in FIG. 2.

FIG. 3 is a block diagram for explaining the data processing of the image processing apparatus shown in FIG. 2. The same reference numerals as in FIG. 2 denote the same parts in FIG. 3.

Referring to FIG. 3, the image reading section 309 includes a lens 301, CCD sensor 302, and analog signal processing section 303. An image of a document 300 formed on the CCD sensor 302 through the lens 301 is converted into an analog electrical signal by the CCD sensor 302. The signal is input to the analog signal processing section 303, subjected to sample-and-hold and dark level correction, and A/D-converted.

Figure 4:
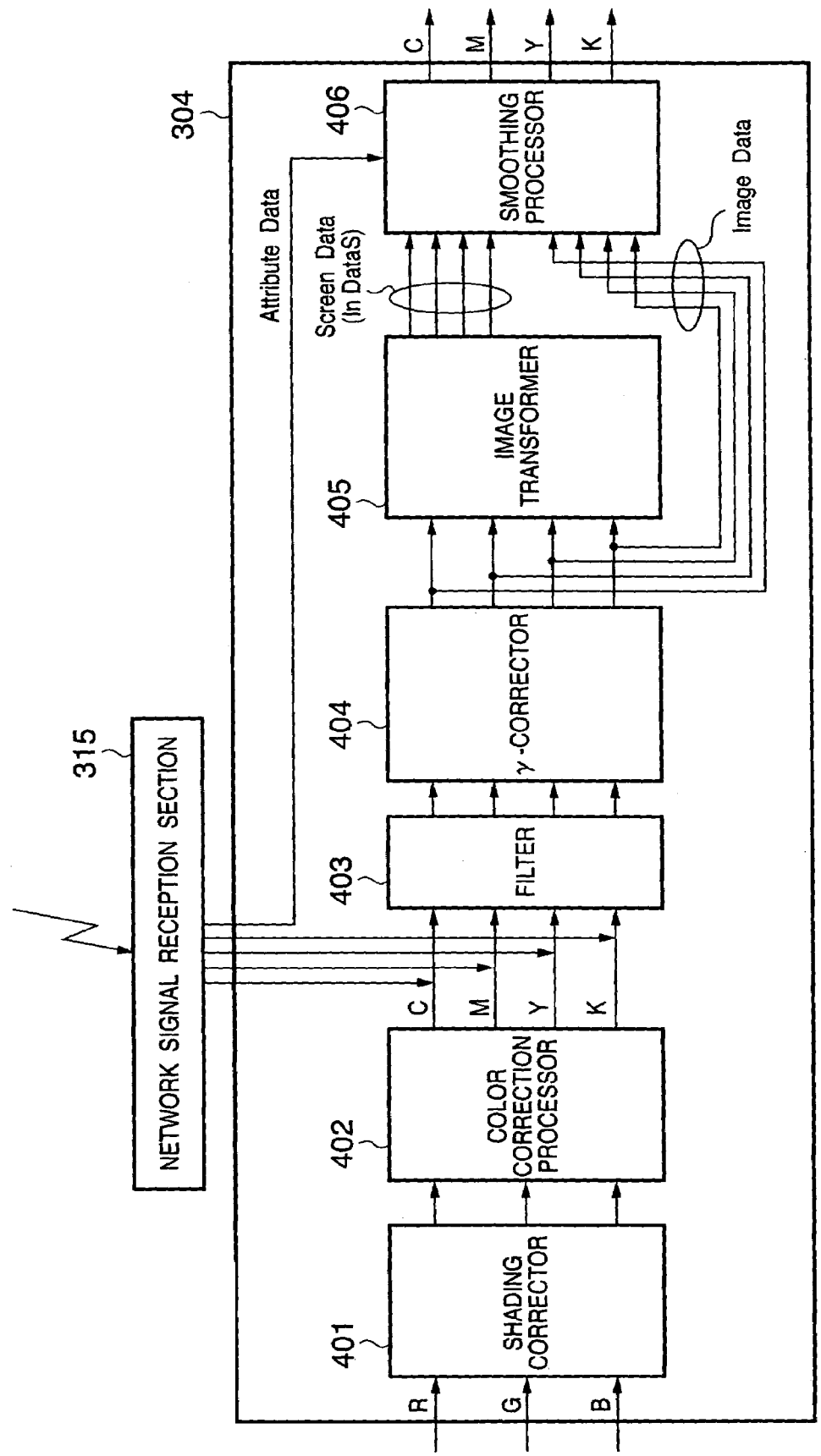
FIG. 4 is a block diagram for explaining the general arrangement of an image processing section shown in FIG. 3.

The converted digital signal is processed in shading corrector 401, color correction processor 402, filter 403, γ-corrector 404, image transformer 405, and smoothing processor 406 in the image processing section 304 whose details are illustrated in FIG. 4. Then, the processed image data is supplied to the printer 305. In the image transformer 405, input image data having N bits per pixel is converted into image data having M bits per pixel. More specifically, in this embodiment, N=8, and M=4. The image transformation which indicates screen (dither) processing or error diffusion processing is known, and a detailed description thereof will be omitted.

Processing operations except the smoothing processor 406 including the point of the present invention are also known, and a description thereof will be omitted.

Referring to FIG. 4, the signals from the network signal reception section 315 are supplied to outputs of the color correction processor 402. This is because the signals received through the network are assumed to be CMYK density data. If the received signals are RGB luminance signals, they are supplied to inputs of the color correction processor 402, although not illustrated. If a PDL signal is received through the network, it is converted into a bitmap signal by the network signal reception section 315 and then supplied to the image processing section 304. Exactly, the signals received via the network are supplied to a CPU circuit 310, but the signals are directly supplied to the image processing section 304 as in FIG. 4 for the illustrative convenience.

The printer 305 shown in FIG. 3 includes an exposure control section (not shown) having e.g. a laser and so on, an image forming section (printer engine), and a transfer paper convey control section (not shown). The printer 305 prints an image on a transfer paper sheet based on the input image data.

The CPU circuit 310 includes a CPU 306, ROM 307, and RAM 308. The CPU circuit 310 controls the image reading section 309, image processing section 304, printer section 305, and operation section 313 and systematically controls the sequence of the multi-functional device.

A RAM 311 and ROM 312 are prepared in the operation section 313 so that characters can be displayed on the UI, or information set by the user can be stored or displayed.

Information set by the user on the operation section 313 is sent to the image reading section 309, image processing section 304, or printer 305 through the CPU circuit 310.

The characteristic portion of the present embodiment is included in the processing of the image processing section 304. The smoothing processor 406 in the image processing section 304 will be described below. Constituent elements to be described below are implemented by software, i.e., programs created by the C language. However, equivalent functions may be implemented by hardware or firmware. That is, even when each or some of the constituent elements are formed by using dedicated hardware such as ASIC, the same effect as that of software can be obtained.

Figure 5:
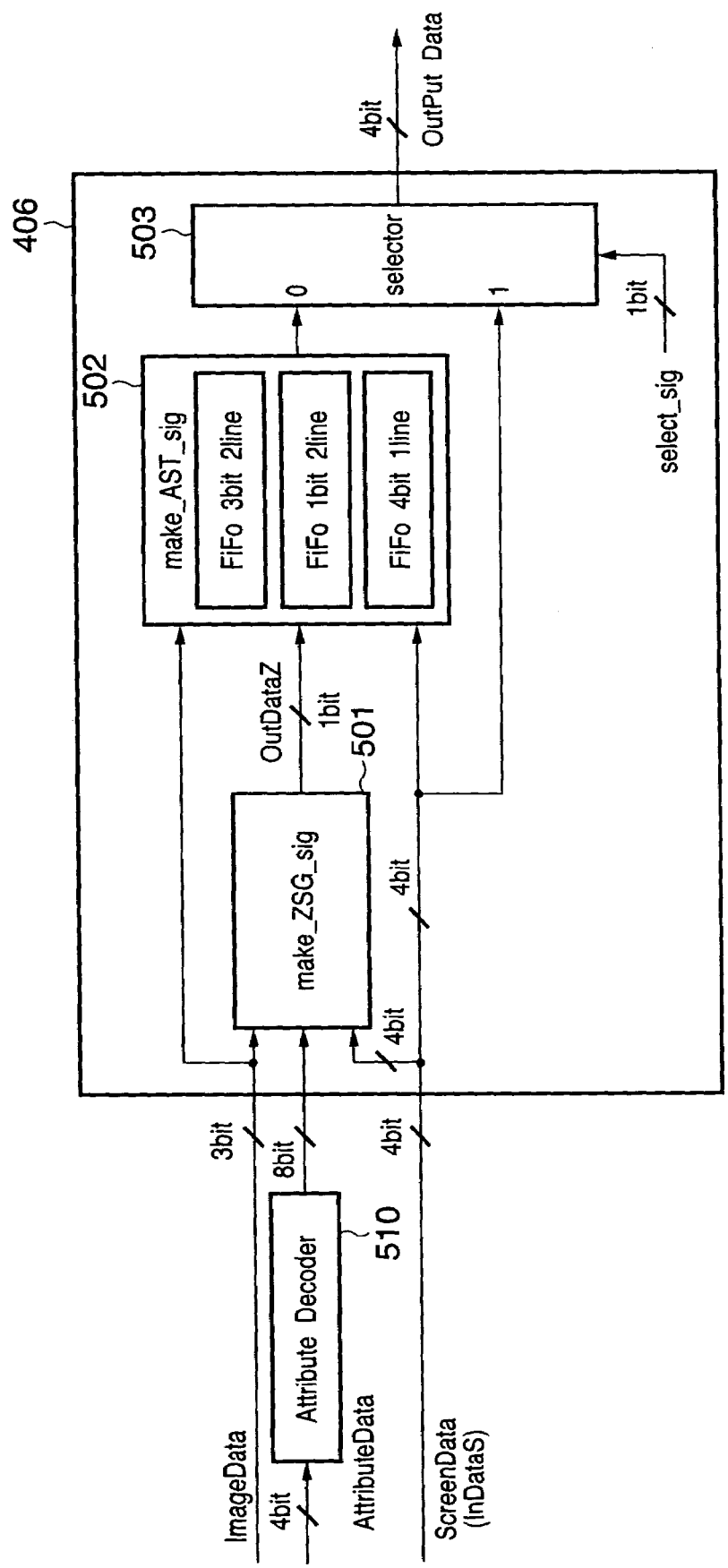
FIG. 5 is a block diagram showing the arrangement of a smoothing processor in FIG. 4.

FIG. 5 is a schematic block diagram showing the arrangement of the smoothing processor 406 shown in FIG. 4. The same reference numerals as in FIG. 4 denote the same parts in FIG. 5.

FIG. 5 shows processing only for one color data (ImageData). However, data of four colors are input to this processing, as shown in FIG. 4. That is, the colors C, M, Y, and K are independently processed.

FIG. 5 shows processing for one of them. The schematic operation flow of the smoothing processor 406 will be described first with reference to FIG. 5.

The smoothing processor 406 receives the upper 3-bit signal of N=8 bits of an image signal supplied from the γ-corrector 404, i.e., before image transformation (e.g., halftoning processing such as screen processing), a 4-bit image attribute signal representing the attribute of each pixel, and M=4 bits of an image signal which has undergone the image transformation. The image signal outputted from the γ-corrector 404 is expressed by ImageData (first image data); the image attribute signal, AttributeData (attribute data); and the image signal outputted from the image transformer 405, ScreenData (InDataS) (second image data).

The image attribute signal (AttributeData) is data representing the attribute of the image (i.e. whether the image is text (character), image (photo), graphic, or the other) formed by each pixel. This 4-bit signal is converted into an 8-bit image attribute signal by an attribute decoder 510, as will be described later.

A determination section (make_ZSG_sig) 501 serving as a determination means generates a judgment signal (OutDataZ) to be used to determine whether or not to execute smoothing processing. A processing execution section (make_AST_sig) 502 serving as an edge correction generation means executes smoothing processing corresponding to the judgment signal. A selector 503 serving as a selection means compares the output from the processing execution section 502 with ScreenData. Of the ScreenData and the value of pixel data, which has undergone the smoothing processing corresponding to the judgment signal, the pixel data having a larger-value is output as output data (OutputData).

Processing by each section in the above-described smoothing processor 406 will be described below in detail.

FIGS. 6A and 6B depict views for explaining processing executed by the attribute decoder 510 shown in FIG. 5. Referring to FIG. 6A, a portion 601 (Attribute Decoder input) indicates attribute data (AttributeData) to be input to the attribute decoder. Each bit of the input signal 601 represents an attribute such as a line thickness, presence/absence of an object, character/non-character, or vector/non-vector. For example, bit 4 is a flag representing the thickness of a line or character, bit 5 is a flag representing the presence/absence of an object, bit 2 is a flag representing character/non-character, and bit 0 is a flag representing vector/non-vector. The four bits are not arranged in the order of bit 0 to bit 3 because they are arbitrarily selected from four or more signal bits.

On the basis of these signals, the attribute decoder 510 generates an 8-bit signal. The table shown in FIG. 6B shows details of signals generated in this embodiment. The additional explanations of FIG. 6B are as follows.

ImageType0: 00000001(0x01): not used
ImageType1: 00000010(0x02): not used
ImageType2: 00000100(0x04): graphic
ImageType3: 00001000(0x08): line
ImageType4: 00010000(0x10): font
ImageType5: 00100000(0x20): small graphic
ImageType6: 01000000(0x40): thin line
ImageType7: 10000000(0x80): small font "REOS" in the table of FIG. 6B indicates that a line or font is thin/small. "Thin/small" represents the result of determination already executed by the printer driver provided in the host computer, which generates image data such as PDL and transmits it to the printer. The threshold value used to determine "thin/small" can arbitrarily be set by the printer driver. The determination may be done in the network signal reception section 315.

As described above, the attribute decoder 510 includes a conversion table, which converts a 4-bit input into an 8-bit output.

Figure 7A:
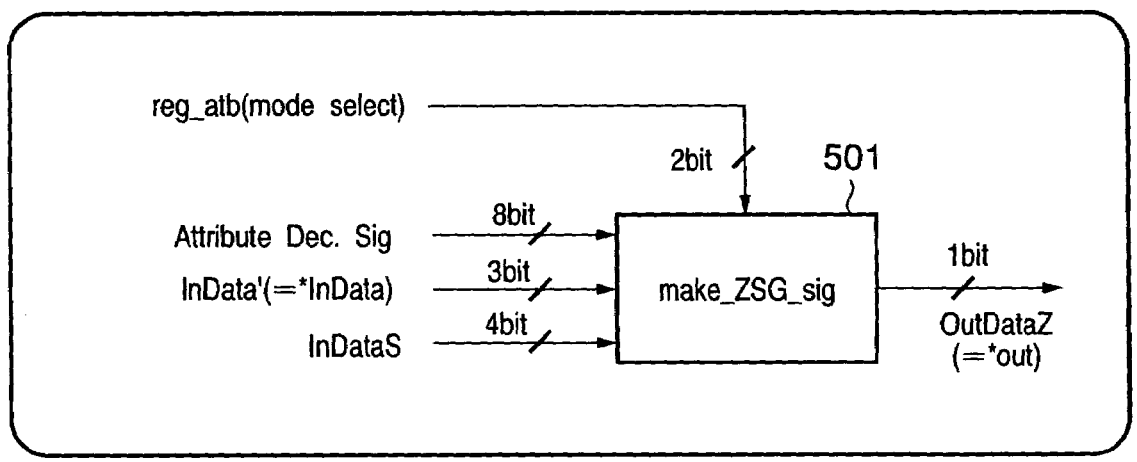
FIG. 7A is a block diagram showing the input/output signals of a determination section (make_ZSG_sig) in FIG. 5.

The operation of the determination section (make_ZSG_sig) 501 will be described next with reference to FIGS. 7A to 7C. FIG. 7A is a block diagram showing input/output signals of the determination section 501. FIGS. 7B and 7C show an example in which processing of the determination section 501 is described by a program language (C language).

As shown in FIG. 7A, the determination section 501 of this embodiment receives the 8-bit signal (AttributeDec.Sig.) output from the above-described attribute decoder 510 and the upper 3-bit signal InData (=InData') of the ImageData supplied from the γ-corrector 404. In accordance with these signals the judgment signal (OutDataZ) is generated by processing shown in FIG. 7B. Note that reg_atb indicates a mode selector (register). The attribute decoder 510 is expressed by attrdec in the program shown in FIG. 7B.

In a portion A shown in FIG. 7B, the InData signal is compared with an arbitrary numerical value (register: reg_Zcheck), and the judgment signal (OutDataZ) is controlled on the basis of their magnitudes. For the AttributeDecoder signal, in a portion B shown in FIG. 7B, the judgment signal (OutDataZ) is controlled in accordance with an arbitrary object. Referring to FIG. 7B, ThinJudge is a register which enables control to execute smoothing processing for only an arbitrary object having an arbitrary density or more. For example, control can be done to execute smoothing processing for, e.g., only characters having a predetermined value or more.

The determination section 501 of this embodiment can execute not only the above-described control but also other several control operations. Switching of control is done in accordance with the signal from the above-described mode selector (register reg_atb).

For example, when reg_atb=1 in a portion C in FIG. 7C, the state of the judgment signal (OutDataZ) is determined in accordance with only the magnitude of the signal (InData) which has not undergone image transformation. The judgment signal (OutDataZ) can be controlled arbitrarily in accordance with reg_Zcheck (register).

When reg_atb=2 in a portion D in FIG. 7C, the state of the judgment signal (OutDataZ) is determined in accordance with only the magnitude of the signal (InData) which has undergone image transformation. Similarly, the judgment signal (OutDataZ) can be controlled arbitrarily in accordance with reg_air (register).

A portion E in FIG. 7C indicates processing executed when the register reg_atb has another value. This processing is prepared to output the signals as they are while maintaining the output phase (timing) of the processing because all the output signals are 0.

Figure 1:
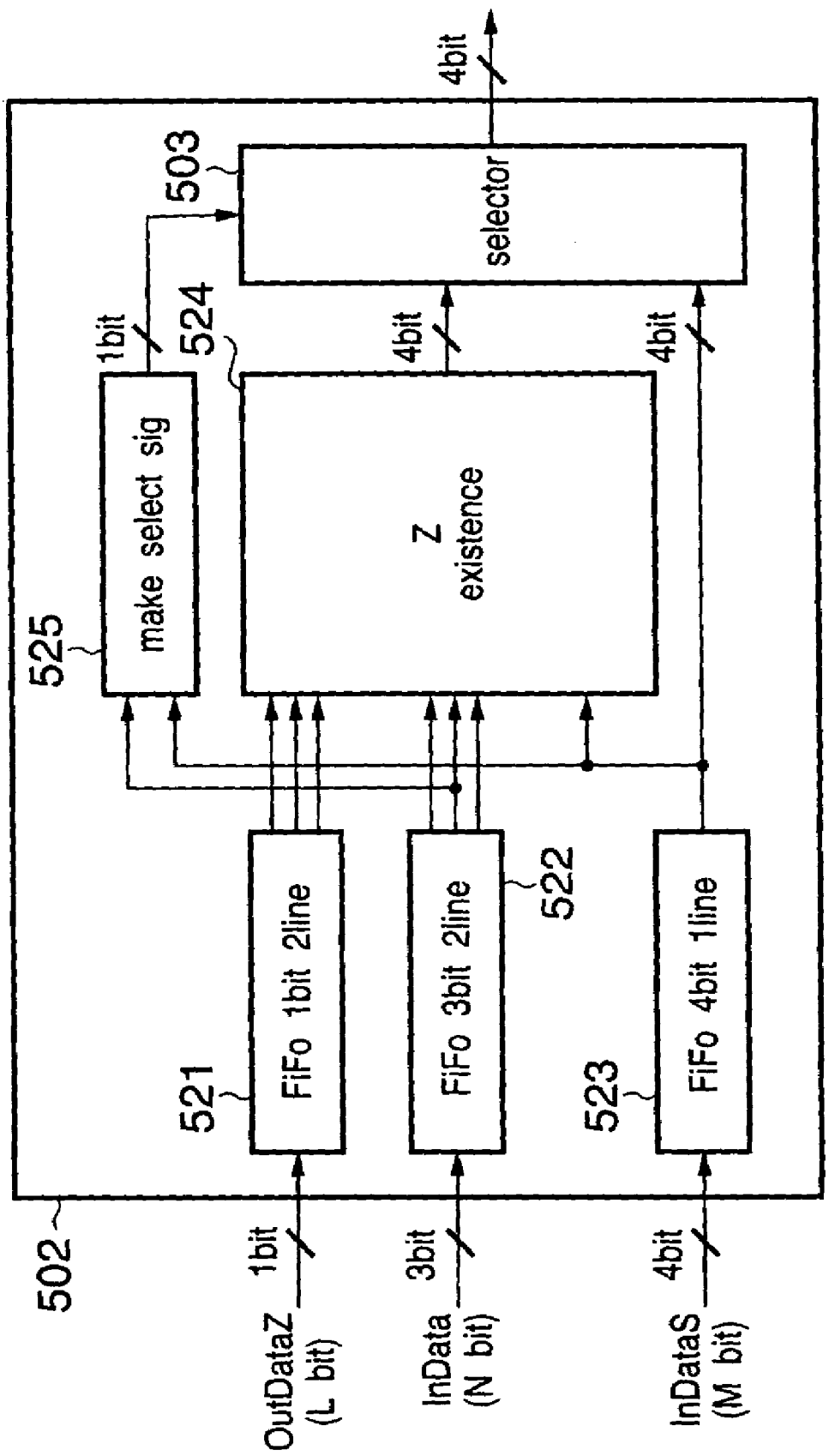
FIG. 1 is a block diagram showing the arrangement of a processing execution section according to an embodiment of the present invention.

The processing execution section (make_AST_sig) 502 will be described next with reference to FIG. 1. FIG. 1 illustrates the processing execution section 502 including the selector 503 for the descriptive convenience. This block has the largest cost reduction effect as compared to the prior art.

As shown in FIG. 1 the processing execution section (make_AST_sig) 502 receives the 1-bit judgment signal (OutDataZ) generated by the above-described determination section (make_ZSG_sig), the upper 3-bit signal (InData) of the image data supplied form the γ corrector 404, and the 4-bit signal (InDataS) of the screen data supplied from the image transformer 405. The processing execution section (make_AST_sig) 502 outputs a 4-bit signal. The image transformation includes halftoning processing such as screen processing. The above-described signals are input to FiFo memories 521 to 523 shown in FIG. 1, respectively, and delayed by a predetermined number of lines. In this embodiment, the capacity of the memories 521 to 523 is much smaller than before. In addition, the processing system is simplified while accomplishing the same effect as in the conventional case.

The judgment signal (OutDataZ) and the upper 3-bit signal (InData) are input to a reproduction section (Zexistence) 524 through the FiFo memories 521 and 522. Only the signal of the edge portion is regenerated. The selector 503 selects and outputs one of the 4-bit signal (InDataS) and the output signal from the reproduction section (Zexistence) in accordance with the output from a selection section (make_select_sig) 525. The selection section (make_select_sig) 525 generates the selection signal in accordance with the difference (density difference) between the upper 3-bit signal (InData) and the 4-bit signal (InDataS). In this embodiment, processing is simplified in this way, thereby reducing the cost. Details of processing will be described later.

Figure 8A:
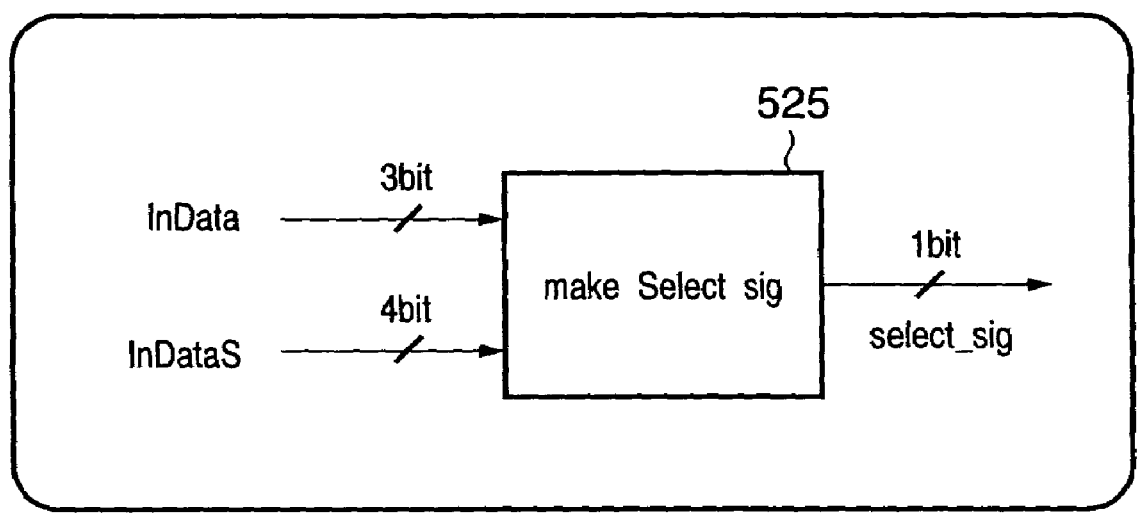
FIG. 8A is a block diagram showing the input/output signals of a selection section (make_select_sig)

The selection section (make_select_sig) 525 will be described with reference to FIGS. 8A and 8B. FIG. 8A is a block diagram showing the input/output signals of the selection section 525. FIG. 8B is a view showing an example in which processing of the selection section 525 is described by a program language (C language).

As described above, the selection section 525 receives InData and InDataS. The selection section 525 basically executes processing of comparing the signals and outputting "1" if InData is larger than InDataS, and "0" if InData is smaller than InDataS. Since the selection section 525 compares InData of 3-bit data with InDataS of 4-bit data, the bit-lengths of InData and IndataS have to be made uniform before the comparison, as described in the program example shown in FIG. 8B. In the program, InData is converted into sel_InData, and then InDataS is converted into sel_InDataS, and they are compared.

In this way, InData and InDataS are compared, and a signal with a higher density, i.e., a signal with a larger value is selected. With this processing, the degradation of the image quality due to a thin edge or low density can be prevented.

More specifically, when the edge signal reproduced by the reproduction section (Zexistence) 524 (to be described later) is smaller than the edge signal of the original InDataS, and the signal from the reproduction section is output, the edge portion becomes thin, as described above, and the image quality is lowered. To prevent this, the selection section (make_select_sig) 525 is provided.

Figure 9:
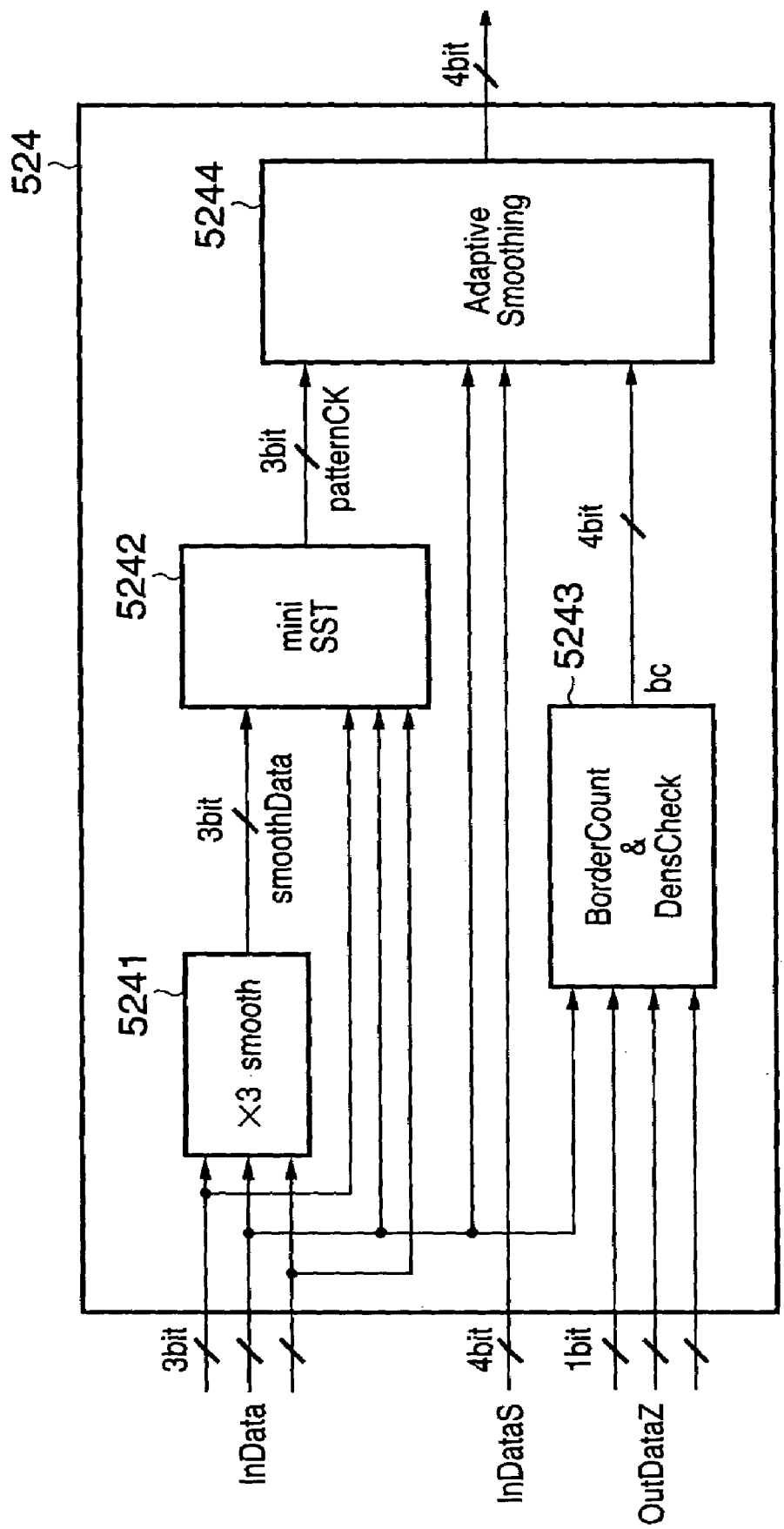
FIG. 9 is a block diagram showing the arrangement of a reproduction part (Zexistence) in FIG. 1.

Processing of the reproduction part (Zexistence) 524 as a characteristic feature of this embodiment will be described in detail with reference to the block diagram in FIG. 9.

The reproduction section (Zexistence) 524 receives InData and OutDataZ of three lines and InDataS of the line of interest. The reproduction section (Zexistence) 524 incorporates a 3×3 smoothing processor (x3smooth) 5241, pattern matching processing section (miniSST) 5242, edge detection processing section (BorderCount&DensCheck) 5243, and adaptive smoothing processor (AdaptiveSmoothing) 5244. A 4-bit output signal is generated by the processing of the sections. The processing of the sections will be described below in turn.

The 3×3 smoothing processor (x3smooth) 5241 calculates an average of the densities of 3×3 pixels of a 3×3 pixel region contained in InData. Processing of calculating the average of density is known, and a detailed description thereof will be omitted. For example, the number of pixels (pixels to be printed) with a density of 1 of nine pixels is obtained and divided by 9. In this embodiment, however, to reduce the load on the operation processing section, after the number of pixels to be printed in the 3×3 pixel region is obtained, 3-bit shift (=÷8) is executed to obtain the output signal (smoothData).

Figure 12:
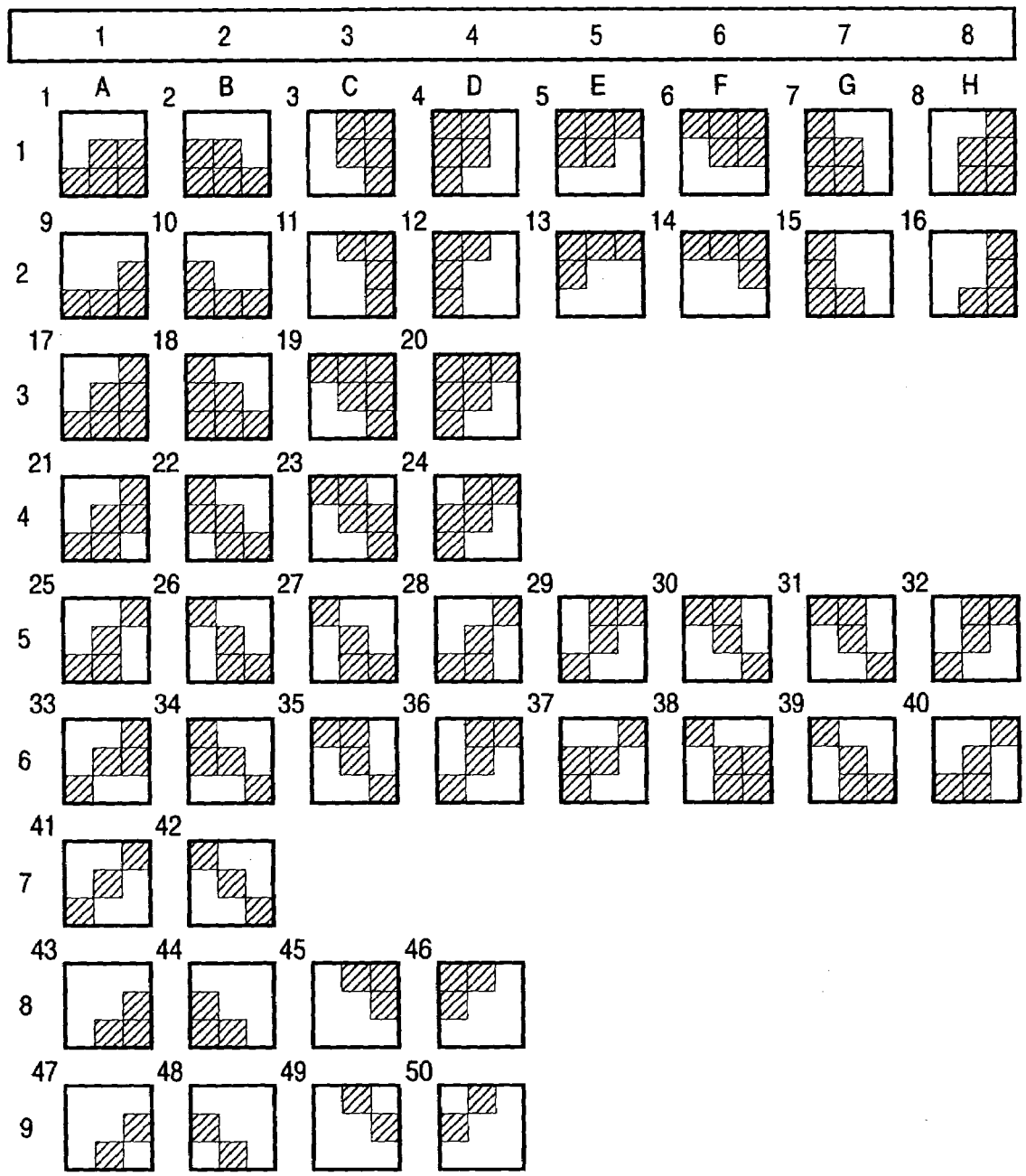
FIG. 12 depicts a view showing examples of patterns used by a pattern matching processing section (miniSST) in FIG. 9.
Figure 14:
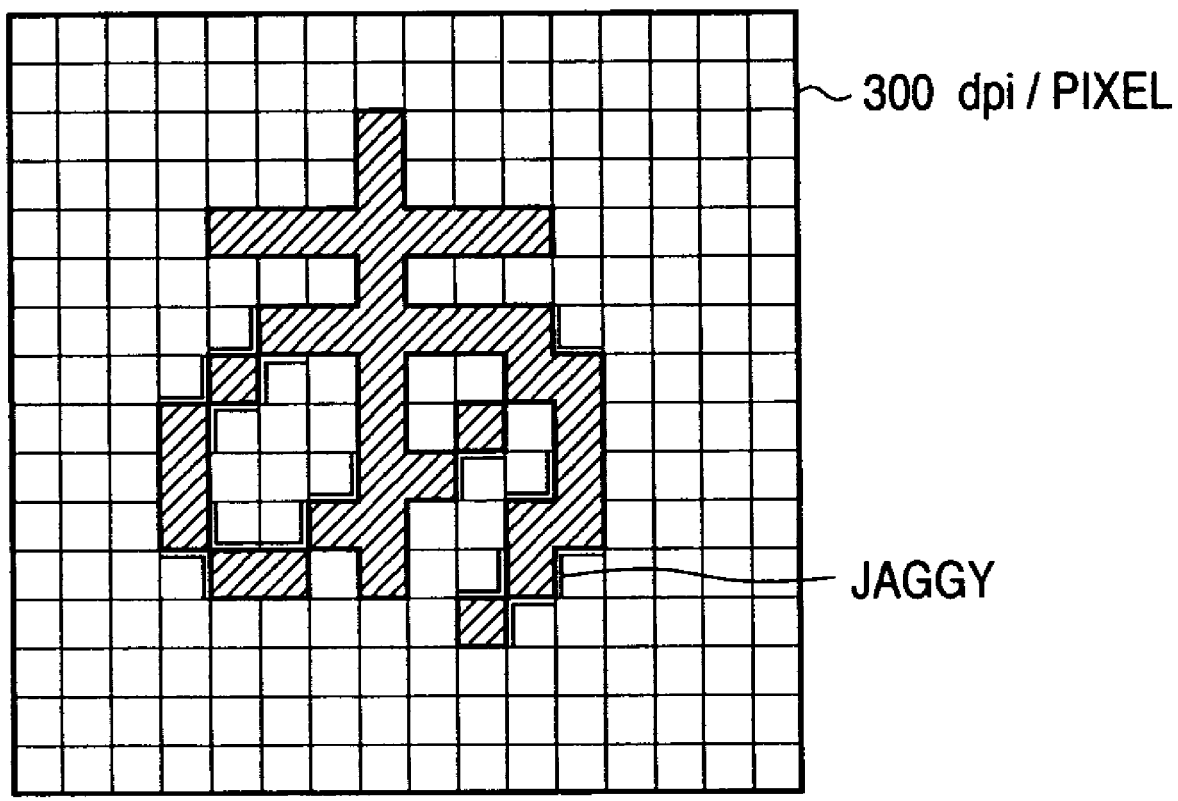
FIG. 14 depicts a view showing jaggies generated in, e.g., the edge portions of a character.
Figure 15A:
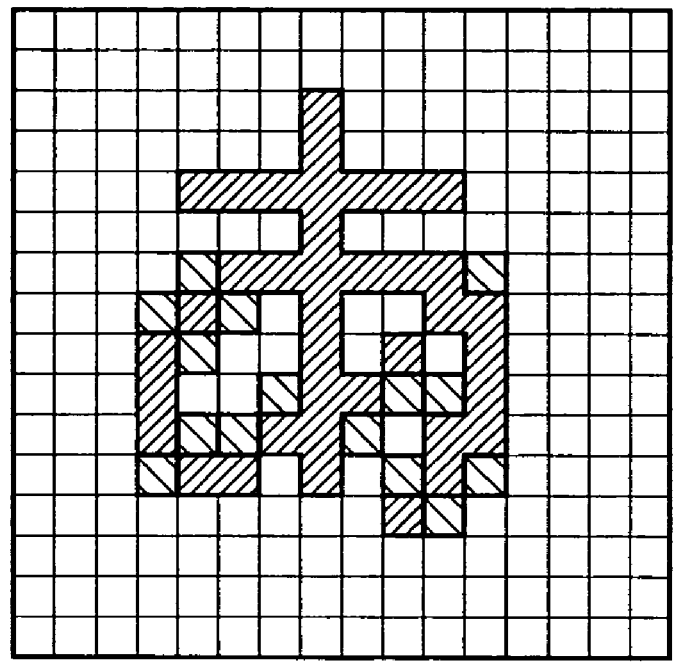
FIGS. 15A and 15B depict schematic views for explaining character processing states in a conventional image processing apparatus.
Figure 15B:
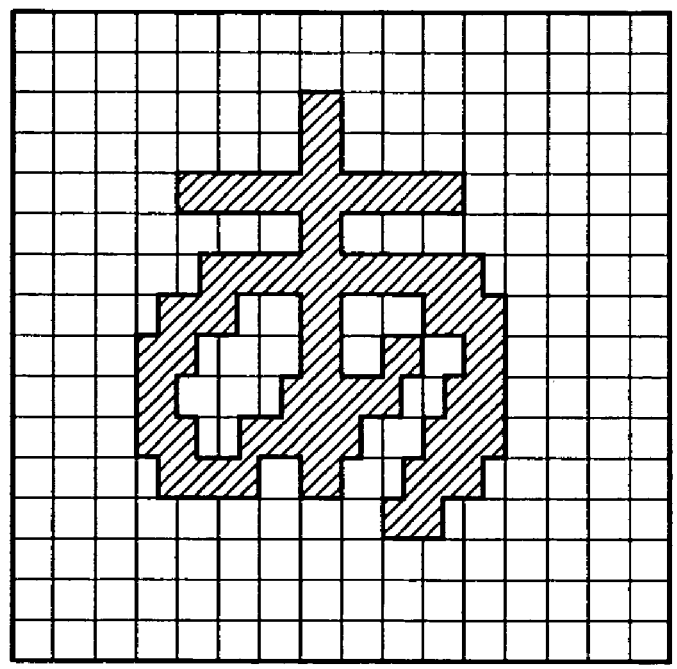
Figure 16A:
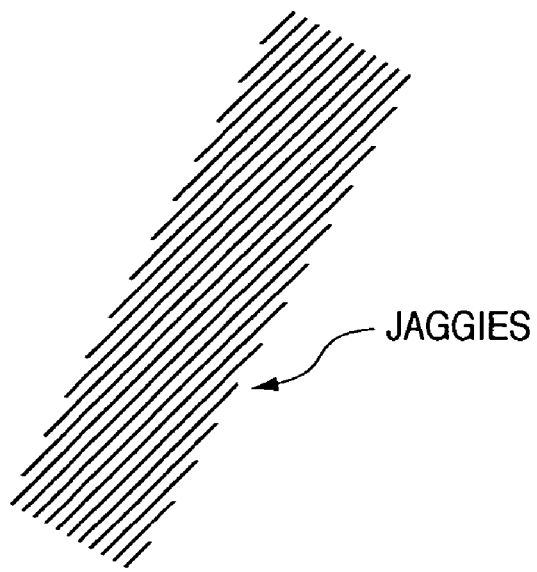
FIGS. 16A and 16B depict views showing a conventional example to improve jaggies generated by halftoning processing such as screen processing.
Figure 16B:
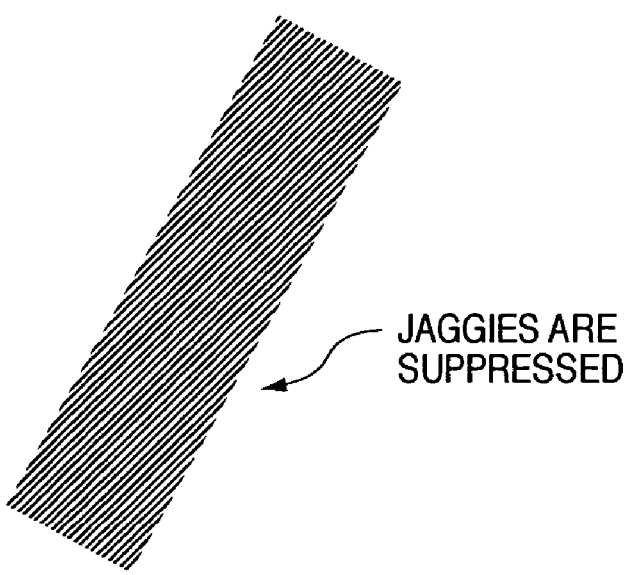

The pattern matching processing section (miniSST) 5242 executes smoothing processing to suppress jaggies depending on the printer resolution by pattern matching. When the printer resolution is, e.g., 300 dpi, jaggies depending on the printer resolution, i.e., the L-shaped portions shown in FIG. 14 are generated as jaggies in a character or line. Patterns shown in FIG. 12 are respectively compared with a signal (not shown) obtained by binarizing InData on the basis of an arbitrary threshold value with respect to each of the 3×3 regions. A signal of each coincident portion is substituted with the output signal (smoothData) from the 3×3 smoothing processor (x3smooth) 5241 shown in FIG. 9. The patterns shown in FIG. 12 are merely examples used in this embodiment, and the present invention is not limited to them. A 3-bit signal (patternCK) in which the jaggies depending on the printer resolution are suppressed is input to the adaptive smoothing processor (AdaptiveSmoothing) 5244 (to be described later).

Figure 10A:
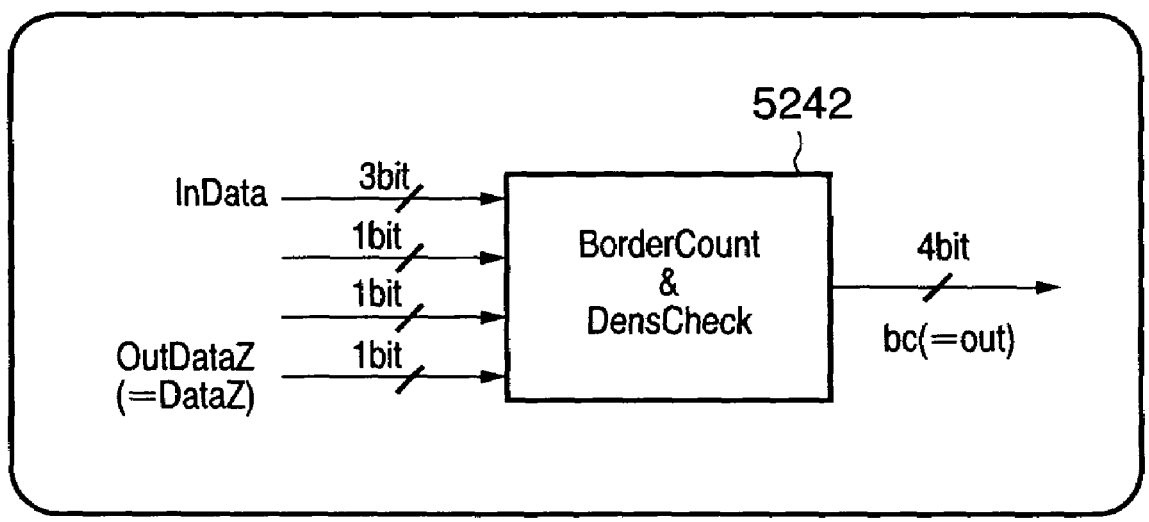
FIG. 10A is a block diagram showing the input/output signals of an edge detection processing section (BorderCount&DensCheck) in FIG. 9.

On the other hand, the edge detection processing section (BorderCount&DensCheck) 5243 generates an edge detection signal by using the OutDataZ signal. FIG. 10A shows the input/output signals of the edge detection processing section (BorderCount&DensCheck) 5243. FIG. 10B shows an example in which processing of the edge detection processing section 5243 is described by a program language (C language).

As shown in FIG. 10A, the edge detection processing section 5243 receives the above-described OutDataZ (=DataZ) signal of three lines and the InData signal of one line (line of interest) and generates an edge detection signal bc (=out). More specifically, a portion A in FIG. 10B counts the number of pixels to be printed (print pixels) with a density of 1 in the 3×3 region by using a 1-bit signal of OutDataZ (=DataZ) (sum=bc). Since the region includes 3×3 pixels, the maximum number is 9. That is, the signal bc is represented by 4 bits. A function represented by valCheck( ) in the program shown in FIG. 10B only determines an edge portion of the image. Since the function executes no substantial processing, a detailed description thereof will be omitted. The above-described (sum=bc) is reprocessed by a portion B in FIG. 10B to generate and output the final 4-bit signal bc.

In this case, if the density value stored in an arbitrary register (reg_Zcheck) is close to the density value of a pixel contained in InData (=data), and InData (=data)=0, the value sum obtained in the above-described manner is cleared (the value is substituted with zero). With this processing, in a region where the density gradually changes like gradation, a creation of an erroneous edge signal can be suppressed and the gray level can be prevented from being discontinuous. That is, when the processing A in FIG. 7B is executed on the basis of the density of InData and the output signal from the attribute decoder described in FIG. 7B, it is possible to make the output signal (OutDataZ) to be 1 in a gradation area of an image. Accordingly, the output signal (OutDataZ) is cleared in FIG. 7B such that the possibility is restrained.

Figure 11A:
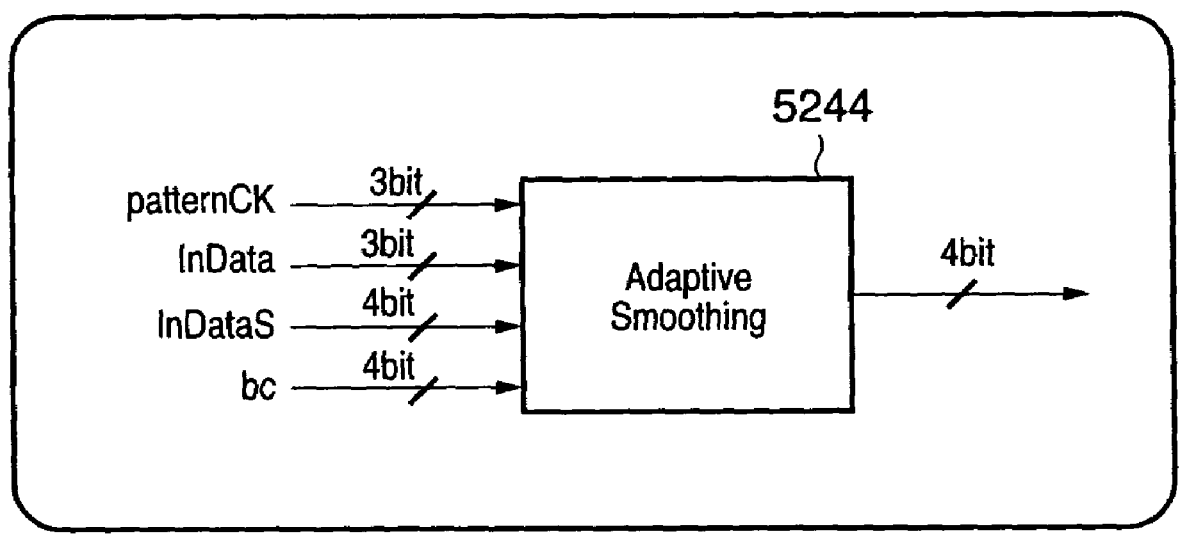
FIG. 11A is a block diagram showing the input/output signals of an adaptive smoothing processor (AdaptiveSmoothing) in FIG. 9.

The adaptive smoothing processor (AdaptiveSmoothing) 5244 will be described finally in detail with reference to FIGS. 11A and 11B. FIG. 11A shows the input/output signals of the adaptive smoothing processor 5244. FIG. 11B shows an example in which processing of the adaptive smoothing processor 5244 is described by a program language (C language).

The adaptive smoothing processor 5244 receives, as input signals, the above described PatternCK, InData, InDataS, and bc and outputs a 4-bit signal. More specifically, when a condition of "(bc==0||bc>=astPower) and (InData!=0)" is satisfied, the signal InDataS supplied from the image transformer 405 is output as they are. Otherwise, when a condition of "ast_params->sstAllOffSW==0(register)" is satisfied, InDataS is output through a table LUTE. When neither conditions are satisfied, patternCK is output through the table LUTE.

LUTE is a lookup table formed by a memory and has a memory space with a 3-bit input and 4-bit output. The table is basically set to linearly convert the input signal to output as the output signal. The table may nonlinearly convert the input signal in accordance with the print characteristics of the printer. If the number of bits of an edge portion needs to be other than 4, the conversion can be executed by using this table.

Figure 13:
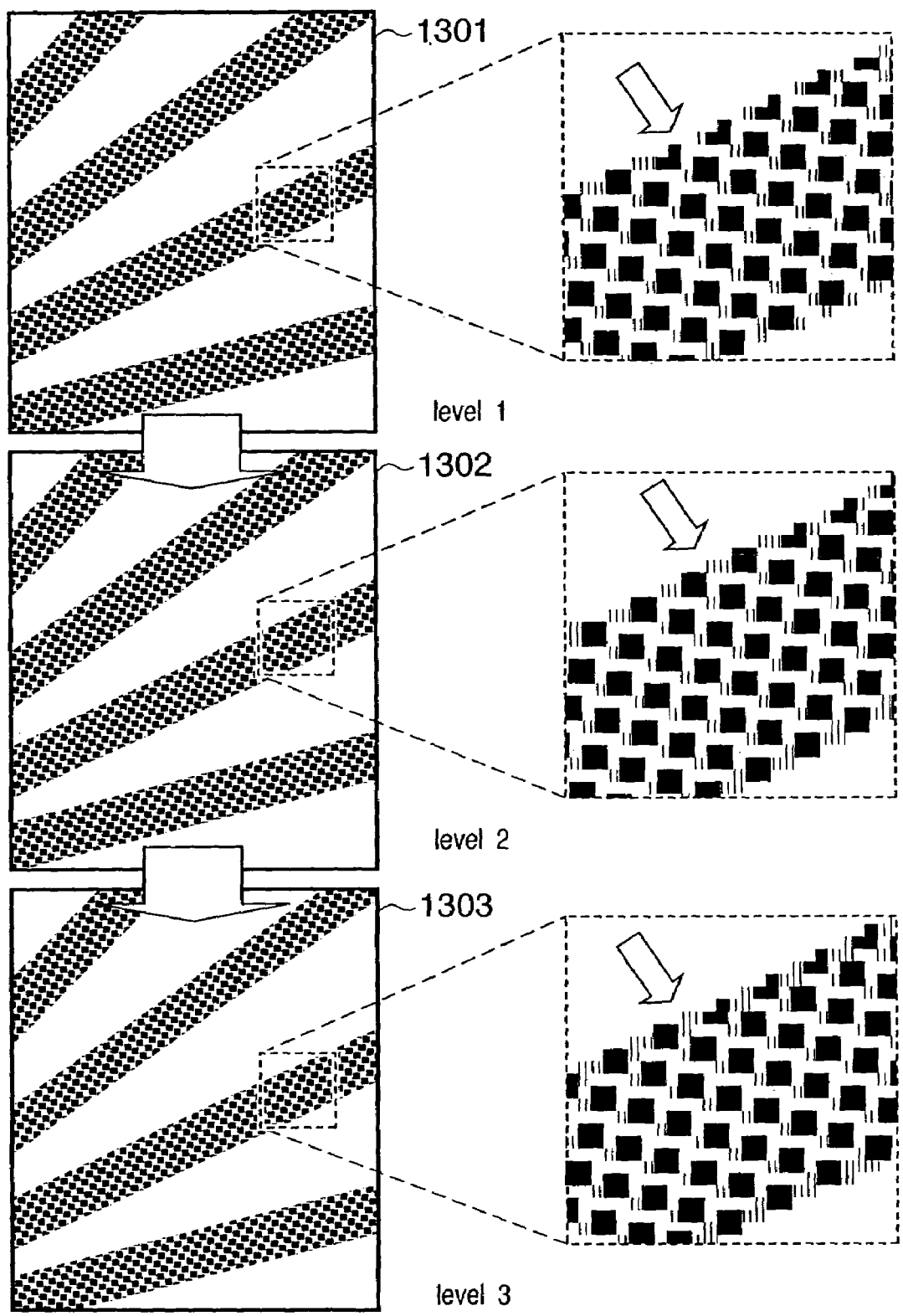
FIG. 13 depicts a view showing a result of edge processing by the image processing apparatus according to the embodiment of the present invention.

In the above-described second condition, "astPower" indicates a register. As a characteristic feature of this embodiment, the substitution to the edge reprocess signal can be adjusted in accordance with the value of the register. FIG. 13 shows an example of an image in which the substitution to the edge reprocess signal is changed actually. Reference numeral 1301 denotes an image in which the value of astPower is decreased (level1). The images changes to 1302 (level2) and 1303 (level3) as the value of astPower increases. In the image data at this time, the number of halftone pixels in the edge portion increases in the order of 1301→1302→1303. When the number of pixels of the edge portion increases, the smoothness of the edge portion also increases. This parameter "astPower" is adjusted to such extent that the character does not look like outlined by addition of halftone pixels.

On the other hand, "ast_params->sstAllOffSW" in the second condition also indicates a register. When this register is set to 0, InData is output through LUTE. That is, smoothing can be executed without reflecting the processing result by the above-described pattern matching processing section (miniSST) 5242. According to the arrangement of not reflecting the result of the pattern matching processing section 5242, a smoothing processing can be omitted in an area of a resolution higher than the printer resolution.

A result obtained by processing by the above-described sections is output from the reproduction section (Zexistence) 524 shown in FIG. 1. The selector 503 selects one of the 4-bit signal (InDataS) and the output signal from the reproduction section (Zexistence) for each pixel in accordance with the output from the selection section (make_select_sig) 525. The selected signal is output to the printer 305 as the result of smoothing processor 406. The output image is shown in FIG. 13 descried above.

FIG. 13 depicts a view showing an edge processing result by the image processing apparatus according to this embodiment. A point of interest is the edge portion. As a characteristic feature, thin data with a variable width is output to fill spaces between the patterns of the screen, as shown in FIG. 13. With the arrangement of this embodiment, this processing can be implemented with higher performance and at a lower cost as compared to the prior art.

As another characteristic feature, even in an image which has undergone lossy compression such as JPEG, the edge portion can be improved without any problem, although not illustrated.

The reason for this is as follows. In creating data for edge detection, a 1-bit image attribute signal is created from the upper 3-bit signal of 8-bit image data. Hence, subtle degraded information by compression can be removed.

As described above, according to this embodiment, not only jaggies depending on the printer resolution but also jaggies generated in an edge portion by halftoning processing using a screen with 175 lines or 133 lines can be suppressed. Such jaggies by the screen are generated at a resolution much lower than the printer resolution and therefore are very noticeable in a halftone character or line. The jaggies are suppressed in the embodiment such that a quality of printed image can be improved.

In addition, processing having flexibility can be implemented by making the substitution range to an edge reprocess signal adjustable. When the substitution range is adjusted, the effect shown in FIG. 13 is obtained. Hence, the apparatus can cope with various printer characteristics.

This embodiment can easily cope with vectorized data of an image read by a scanner. Vectorization indicates converting bitmap data into outline data.

Second Embodiment

The second embodiment of the present invention will be described below. Characteristic parts of the second embodiment will mainly be described below without describing the same parts as in the first embodiment.

In the first embodiment, the resolution of an input image signal is 600 dpi. In the second embodiment, an input image signal is compatible with both 1,200 dpi and 600 dpi.

Figure 17:
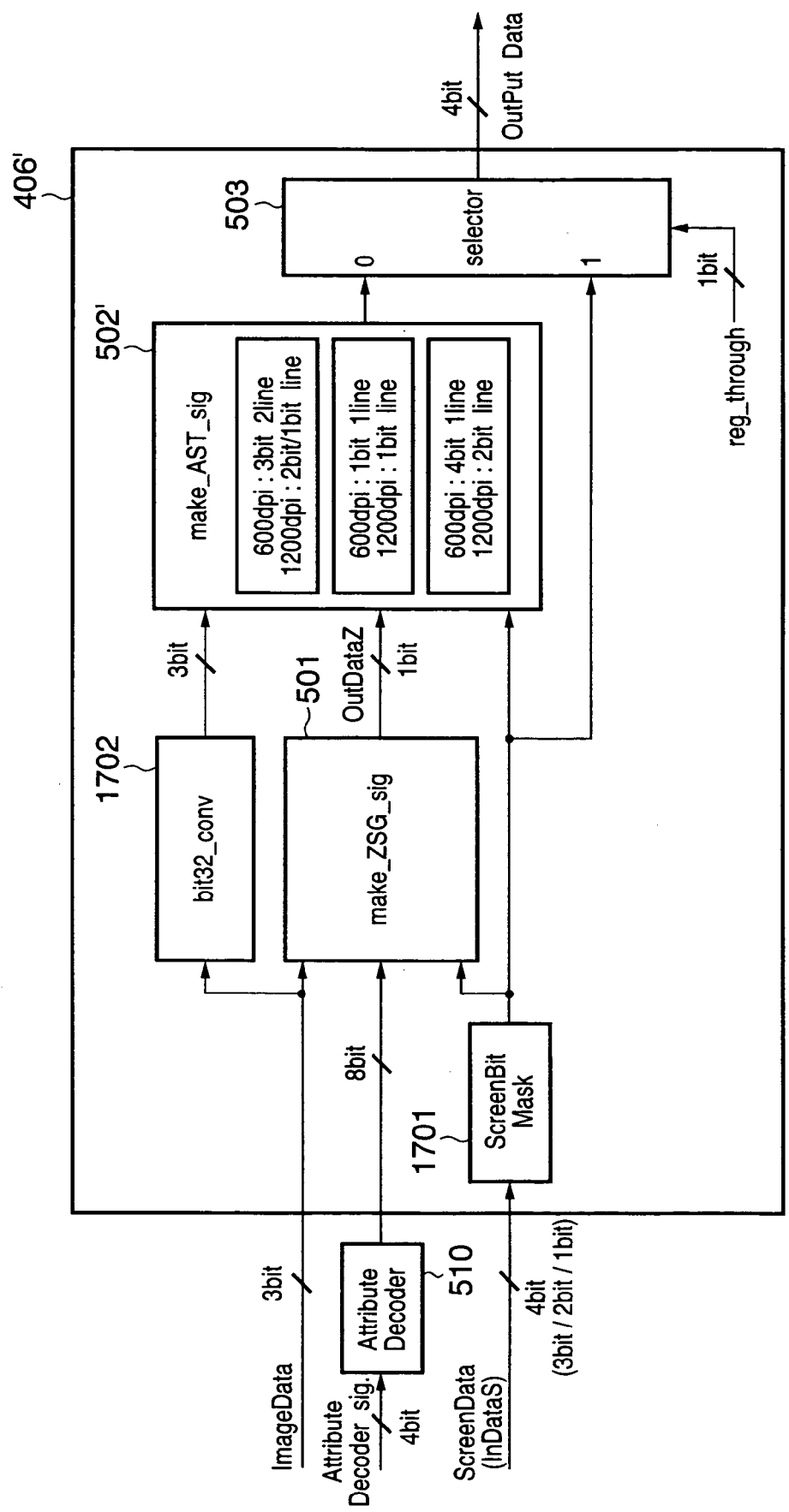
FIG. 17 is a block diagram showing the arrangement of a smoothing processor according to the second embodiment.

FIG. 17 is a schematic block diagram for explaining the arrangement of a smoothing processor 406' as a point of the present invention. FIG. 17 corresponds to FIG. 5 described in association with the first embodiment. The same reference numerals as in FIG. 5 denote the same parts in FIG. 17.

The smoothing processor 406' shown in FIG. 17 additionally includes a bit mask section (ScreenBitMask) 1701 and bit conversion section (bit32_conv) 1702 to be compatible with 1,200 dpi, unlike the smoothing processor 406 shown in FIG. 5. A processing execution section (make_AST_sig) 502' is also modified to be compatible with 1,200 dpi, as will be described later.

By adding or modifying the sections, compatibility with 1,200 dpi is implemented by the same basic arrangement as in the first embodiment. As described above, this embodiment is compatible with both 600 dpi and 1,200 dpi by using the same hardware configuration.

The sections different from FIG. 5 described in association with the first embodiment will be described below in detail.

FIG. 18A is a block diagram showing the input/output signals of the bit mask section (ScreenBitMask) 1701. FIG. 18B shows an example in which processing of the bit mask section 1701 is described by a program language (C language).

Referring to FIG. 18B, "ast_params->bit_select" indicates a parameter for which ⅔ or ⁰⁄₁ is selected depending on whether the resolution of a printer is 1,200 dpi or 600 dpi.

This is because to decrease the capacity of a FiFo memory (to be described later), the upper bits are used and the lower bits are masked in the 1,200-dpi mode. Because of the hardware configuration, the number of bits of signal lines to connect the sections equals the number of bits (4 bits) of 600 dpi. Hence, the number of output bits is four even in 1,200-dpi processing. The bit mask section is designed to decrease the effective data amount to be stored in the FiFo memory in 1,200-dpi processing.

As described in the first embodiment, the signal input to this section is quantized by screening or error diffusion processing.

The bit conversion section (bit32_conv) 1702 will be described next with reference to the FIG. 19A which is a block diagram showing the input/output signals and FIG. 19B which shows an example in which processing of the bit conversion section 1702 is described by a program language (C language).

Referring to FIG. 19B, a parameter indicated by "ast_params->dpi_select" is set to 1 only in the 1,200-dpi output mode.

Figure 19A:
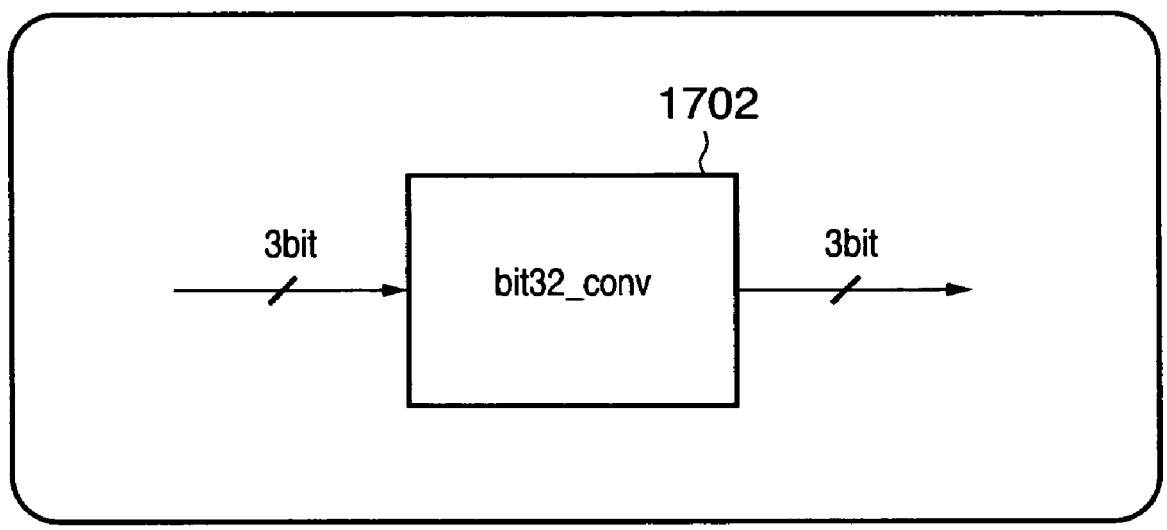
FIG. 19A is a block diagram showing the input/output signals of a bit conversion section in FIG. 17.

Since the sections are common to those in the 600-dpi processing, the number of input/output bits is 3, as shown in FIG. 19A. In 1,200-dpi processing, values set in parameters "ast_params->bit32_conv1" to "ast_params->bit32_conv7" are output to be converted from 3 bits into 2 bits, as shown in FIG. 19B. The 2-bit signal is output while being shifted to be aligned to the upper bit (MSB) side by shifting in "1" from the LSB. The output signal is input to the processing execution section (make_AST_sig) 502' (to be described later) and stored in the FiFo memory.

Figure 20:
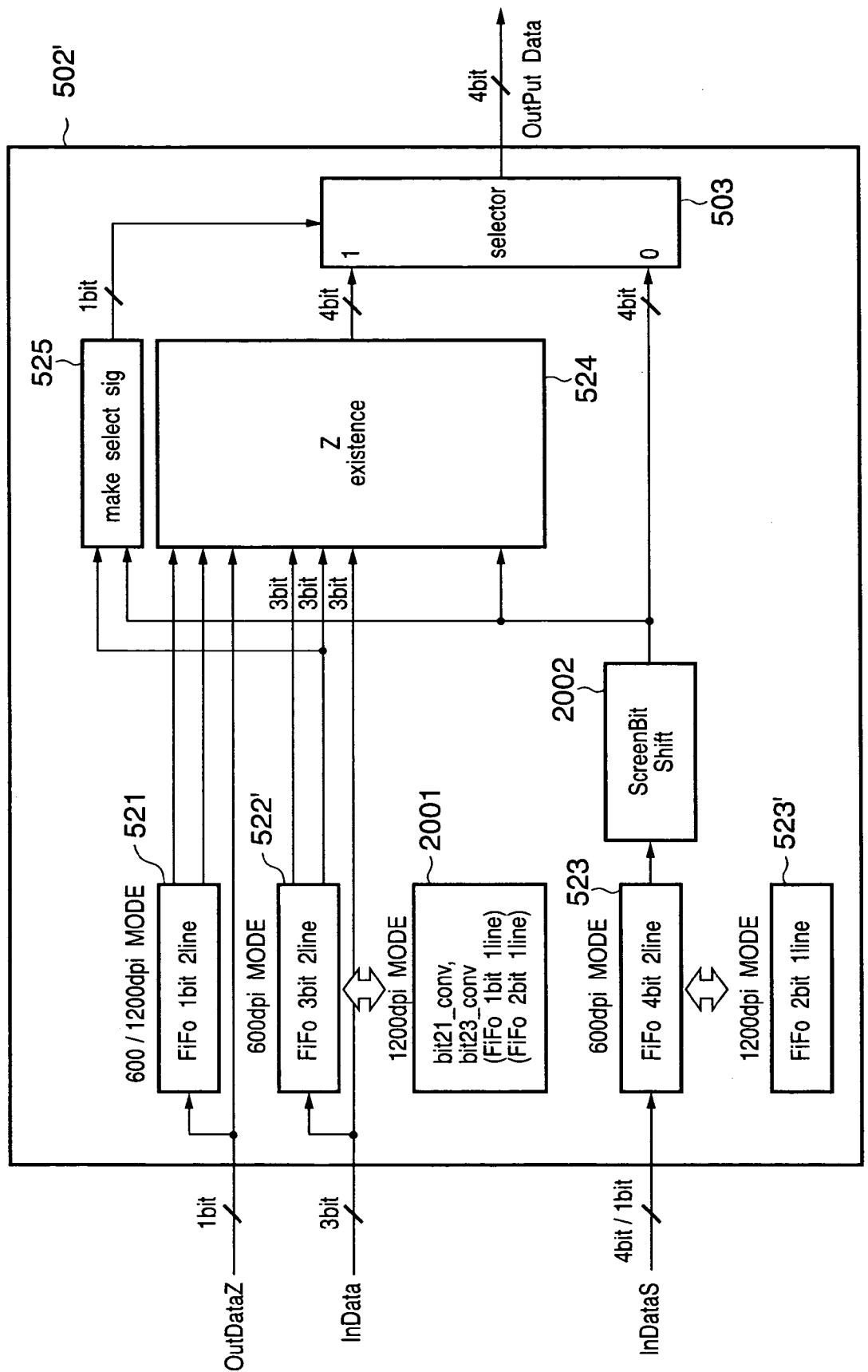
FIG. 20 is a block diagram showing the arrangement of a processing execution section according to the second embodiment of the present invention.

FIG. 20 is a block diagram showing the arrangement of the processing execution section (make_AST_sig) 502' of this embodiment. Unlike the processing execution section 502 of the first embodiment shown in FIG. 1, the processing execution section 502' of the second embodiment includes a block which delays data by using a FiFo memory. This delay is described hereinafter.

As for a judgment signal (OutDataZ), a 1-bit signal is delayed by two lines by a FiFo memory 521, as in the first embodiment, independently of the resolution of 1,200/600 dpi. Hence, even when 1,200-dpi processing is executed, the memory capacity does not increase.

A 4-bit signal InDataS is processed in the following way. In the 600-dpi processing, a 4-bit signal is delayed by one line. In the 1,200-dpi processing, a 2-bit signal is delayed by one line. More specifically, one FiFo memory is used as a memory 523 to delay a 4-bit signal by one line in the 600-dpi processing and as a memory 532' to delay a 2-bit signal by one line in the 1,200-dpi processing. In the 1,200-dpi processing, the number of bits in the length direction (width) of the memory is doubled. However, the number of bits in the depth direction (height) is halved. Hence, the total memory capacity does not change. For InDataS, the total memory capacity need not be increased while implementing the 1,200-dpi processing.

A 1-bit signal of 1,200 dpi is input to this section when the parameter ast_params->bit_select is set to 3 in the bit mask section (ScreenBitMask) 1701, as described in association with FIGS. 18A and 18B.

A FiFo memory 522' for a 3-bit signal InData will be described next. In the 600-dpi processing, a 3-bit signal is delayed by two lines, as shown in FIG. 20. In the 1,200-dpi processing, however, bit conversion is executed before and after the FiFo memory by an input/output conversion section 2001, as will be described later in association with FIGS. 21A to 21C.

Figure 21A:
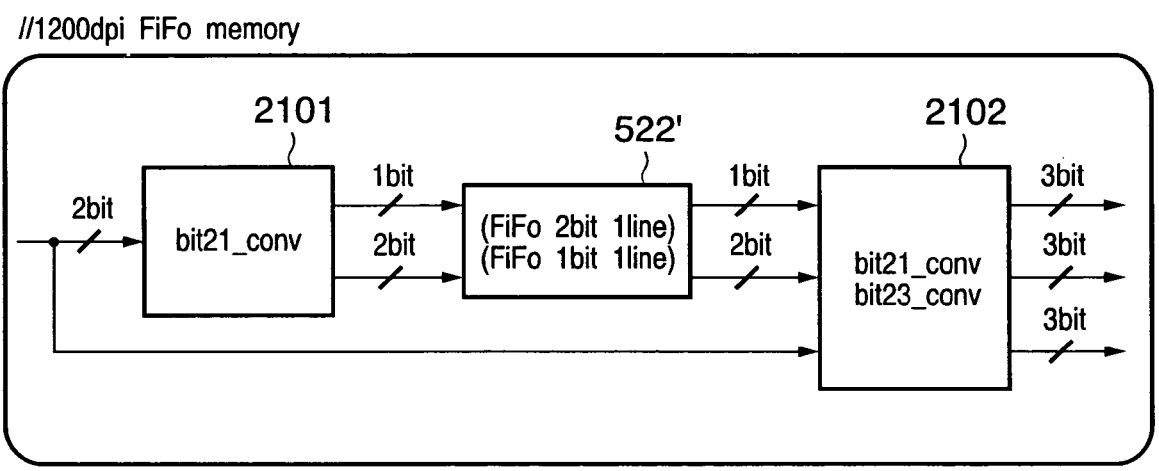
FIG. 21A is a block diagram showing the arrangement of an input/output conversion section in FIG. 20 together with a FiFo memory.

Referring to FIGS. 21A to 21C, processing by the input/output conversion section 2001 at 1,200 dpi will be described. FIG. 21A is a block diagram showing the arrangement of the input/output conversion section 2001 together with a FiFo memory 5221.

An input conversion section (bit21_conv) 2101 generates a 1-bit signal and a 2-bit signal from InData. FIG. 21B shows an example in which processing of the bit21_conv module contained in the input conversion section 2101 is described by a program language (C language). As a characteristic feature, the 1-bit and 2-bit signals comprises a 2-bit signal delayed by one line and a 1-bit signal delayed by one more line (i.e. two lines). That is, the bit accuracy degrades as the distance from the pixel of interest increases. When the signals are input to the FiFo memory 522' in this state, the memory capacity does not increase as compared to the 600-dpi processing.

The 1-bit and 2-bit signals are read from the FiFo memory 522' and converted into each signal of 3-bits by an output conversion section 2102 including two modules bit21_conv and bit23_conv. Processing of the bit21_conv module is shown in the example described by the program language (C language) in FIG. 21B, and processing of the bit23_conv module is shown in the example described by the program language (C language) in FIG. 21C. The characteristics of conversion by the conversion section 2102 will be summarized below. When the above-described parameter ast_params->dpi_select is 1, i.e., when 1,200 dpi is designated, each line-delayed data is converted into (substituted with) a 3-bit signal in accordance with the parameter ast_params->bit21_conv or parameters ast_params->bit23_conv1 to ast_params->bit23_conv3.

Figure 22A:
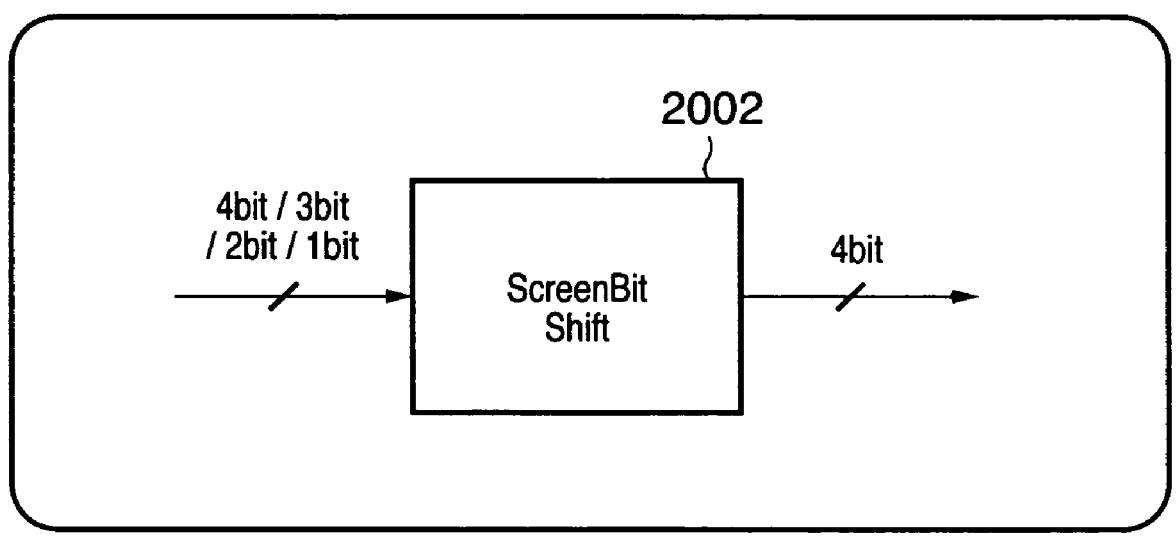
FIG. 22A is a block diagram showing the input/output signals of a bit shift section in FIG. 20.

A bit shift section (ScreenBitShift) 2002 which bit-shifts the signal output from a FiFo memory 523 or 523' will be described with reference to FIG. 22A which is a block diagram showing the input/output signals and FIG. 22B which shows an example in which processing is described by a program language (C language).

Processing of the bit shift section 2002 is described in FIG. 22B, and a detailed description thereof will be omitted. In the second embodiment, even when the number of bits of input InDataS is different from that in the first embodiment, bit shift is executed to change the number of bits into four so as to commonly use the hardware configuration for 600 dpi described in the first embodiment.

As described above, according to the second embodiment, the processing at 1,200 dpi can be executed by using the same hardware configuration and a FiFo memory with the same capacity as in the first embodiment for the 600-dpi processing. That is, according to the second embodiment, both 600-dpi processing and 1,200-dpi processing can be implemented without increasing the cost.

Other Embodiment

As described above, as a characteristic feature of the present invention, correction faithful to image transformation can be performed because data, which has undergone image transformation is processed. That is, the present invention can also suitably be adapted to a printer such as a Fax with a low resolution. However, according to the present invention, output to compensate for a degradation in image quality of an edge portion can be done even for an image which has undergone lossy compression such as JPEG, unlike the conventional method.

In addition, the present invention is effective not only for an image in which screen processing has been undergone but also for an image in which an error diffusion processing has been undergone A halftone character or line which has undergone the error diffusion processing has jaggies. The present invention can also suppress them.

Furthermore, the present invention is also effective for mosquito noise in an edge portion, which is generated by lossy compression such as JPEG. That is, the present invention can restrain a degradation in edge portion caused by compression.

The present invention can be applied to a system comprising a plurality of devices or to an apparatus comprising a single device.

For example, when the present invention is applied to an image processing apparatus, the image quality of an edge portion can be improved in both an image read by a scanner and a PDL image transmitted from a computer device.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program. Further, it is possible to execute similar processing by a hardware designed on the basis of the above program, such as an ASIC.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

For instance, this is the case where these processing are executed by a driver of a printing apparatus to be installed in a personal computer.

As many apparently widely different embodiments of the present invention can be made without departing from the spirit and scope thereof, it is to be understood that the invention is not limited to the specific embodiments thereof except as defined in the claims.

CLAIM OF PRIORITY

This application claims priority from Japanese Patent Applications No. 2004-318239 filed on Nov. 1, 2004 and No. 2005-80592 filed on Mar. 18, 2005, which are hereby incorporated by references herein.

What is claimed is:

1. An image processing apparatus for suppressing jaggies in second image data on the basis of first image data, the second image data obtained by executing halftoning processing for the first image data, and attribute data representing an attribute of each pixel contained in the first image data, comprising:

determination means for determining whether or not to execute smoothing processing on the basis of the attribute data, and outputting a judgment signal indicating the determination result;

edge correction generation means for generating edge collection data from the first image data by executing smoothing processing in accordance with the judgment signal; and selection means for comparing pixel data of the second image data with pixel data of the edge correction data output by said edge correction generation means and selecting the pixel data having a higher density.

2. The apparatus according to claim 1, wherein said edge collection generation means comprises:

smoothing means for implementing smoothing processing on each pixel in a region with a predetermined size;

matching processing means for quantizing the first image data by
using a predetermined threshold value,
comparing a region of the predetermined size including a pixel of interest of quantized first image with a pattern, and
in a case where the pattern is matched with the region, for outputting pixel data of the pixel of interest of the first image data on which the smoothing processing is implemented by said smoothing means;

edge detection means for outputting an edge detection signal on the basis of the judgment signal and the first image data; and adaptive smoothing processing means for outputting, in accordance with the edge detection signal, one of the pixel data contained in the second image data and the pixel data from said matching processing means.

3. The apparatus according to claim 2, wherein said adaptive smoothing processing means outputs the pixel data contained in the second image data in a case where the edge detection signal is not output, and otherwise, outputs the pixel data from said matching processing means.

4. The apparatus according to claim 2, wherein said adaptive smoothing processing means comprises conversion means for converting the pixel data from said matching processing means into data having a predetermined number of bits by looking up a lookup table.

5. The apparatus according to claim 2, wherein said edge detection means compares a sum of pixel values in the region with the predetermined size including the pixel of interest with a predetermined threshold value and, in a case where the sum of the pixel values is smaller than the threshold value, outputs the edge detection signal.

6. The apparatus according to claim 1, wherein in a case where the number of bits of the pixel data of the second image data is different from that of the edge collection data output from said edge correction generation means, said selection means executes comparison after equalizing the number of bits by filling lower bits of the pixel data with a smaller number of bits with "1".

7. The apparatus according to claim 2, wherein the region with the predetermined size in said smoothing means and said matching processing means is a region including not less than 3×3 pixels.

8. The apparatus according to claim 5, wherein the predetermined threshold value is changeable, and jaggy can be suppressed in accordance with the predetermined threshold value.

9. The apparatus according to claim 1, further comprising data conversion means for, in a case where the first image data has a resolution different from a predetermined resolution, executing conversion processing for the first image data and the second image data so as to cause said edge collection generation means to execute the same processing as that for data having the predetermined resolution.

10. An image processing method of suppressing jaggies in second image data on the basis of first image data, the second image data obtained by executing halftoning processing for the first image data, and attribute data representing an attribute of each pixel contained in the first image data, the method comprising:

a determination step of determining whether or not to execute smoothing processing on the basis of the attribute data, and outputting a judgment signal indicating the determination result;

an edge correction generation step of generating edge collection data from the first image data by executing smoothing processing in accordance with the judgment signal; and a selection step of comparing pixel data of the second image data with pixel data of the edge correction data output in said edge correction generation step and outputting pixel data having a higher density, wherein at least some of said steps are performed using a computer.

11. The method according to claim 10, wherein said edge correction generation step comprises:

a smoothing step of implementing smoothing processing on each pixel in a region with a predetermined size;

a matching processing step of quantizing the first image data by
(i) using a predetermined threshold value,
(ii) comparing a region of the predetermined size including a pixel of interest of quantized first image with a pattern, and
(iii) in a case where the pattern is matched with the region, of outputting pixel data of the pixel of interest of the first image data on which the smoothing processing is implemented in said smoothing step;

an edge detection step of outputting an edge detection signal on the basis of the judgment signal and the first image data; and an adaptive smoothing processing step of outputting, in accordance with the edge detection signal, one of the pixel data contained in the second image data and the pixel data outputted in said matching processing step.

12. The method according to claim 11, wherein said adaptive smoothing processing step includes outputting the pixel data contained in the second image data in a case where the edge detection signal is not output, and otherwise, outputting the pixel data outputted in said matching processing step.

13. The method according to claim 11, wherein said adaptive smoothing processing step comprises a conversion step of convening the pixel data outputted in said matching processing step into data having a predetermined number of bits by looking up in a lookup table.

14. The method according to claim 11, wherein said edge detection step includes comparing a sum of pixel values in the region with the predetermined size including the pixel of interest with a predetermined threshold value and, in a case where the sum of the pixel values is smaller than the threshold value, outputting the edge detection signal.

15. The method according to claim 10, wherein, in a case where the number of bits of the pixel data of the second image data is different from that of the edge correction data output in said edge correction generation step, said selection step includes executing comparison after equalizing the number of bits by filling lower bits of the pixel data with a smaller number of bits with "1".

16. The method according to claim 11, wherein the region with the predetermined size in said smoothing step and said matching processing step is a region including not less than 3×3 pixels.

17. The method according to claim 14, wherein the predetermined threshold value is changeable, and jaggies can be suppressed in accordance with the predetermined threshold value.

18. The method according to claim 10, further comprising a data conversion step of, in a case where the first image data has a resolution different from a predetermined resolution, executing conversion processing for the first image data and the second image data so as to cause said edge collection generation step to execute the same processing as that for data having the predetermined resolution.

19. A computer-readable storage medium storing a program to make a computer execute an image processing method of suppressing jaggies in second image data on the basis of first image data, the second image data obtained by executing halftoning processing for the first image data, and attribute data representing an attribute of each pixel contained in the first image data, the method comprising:

a determination step of determining whether or not to execute smoothing processing on the basis of the attribute data, and outputting a judgment signal indicating the determination result;

an edge correction generation step of generating edge collection data from the first image data by executing smoothing processing in accordance with the judgment signal; and a selection step of comparing pixel data of the second image data with pixel data of the edge correction data output in said edge correction generation step and outputting pixel data having a higher density.

* * * * *